United States Patent
Chae et al.

(10) Patent No.: US 9,350,413 B2
(45) Date of Patent: *May 24, 2016

(54) METHOD FOR GENERATING UNAMBIGUOUS CORRELATION FUNCTION FOR CBOC(6,1,1/11) SIGNAL BASED ON MULTI STAGE COMPOSITION OF PARTIAL CORRELATION FUNCTIONS, APPARATUS FOR TRACKING CBOC SIGNALS AND SATELLITE NAVIGATION SIGNAL RECEIVER SYSTEM

(71) Applicant: Research & Business Foundation SUNGKYUNKWAN UNIVERSITY, Suwon-si (KR)

(72) Inventors: Keun Hong Chae, Suwon-si (KR); Seok Ho Yoon, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/546,216

(22) Filed: Nov. 18, 2014

(65) Prior Publication Data
US 2015/0155908 A1 Jun. 4, 2015

(30) Foreign Application Priority Data
Nov. 19, 2013 (KR) ........................ 10-2013-0140688

(51) Int. Cl.
| | | |
|---|---|---|
| H04B 1/709 | (2011.01) | |
| H04B 1/7075 | (2011.01) | |
| H04B 1/707 | (2011.01) | |

(52) U.S. Cl.
CPC .... *H04B 1/7075* (2013.01); *H04B 2001/70706* (2013.01); *H04B 2201/70715* (2013.01)

(58) Field of Classification Search
CPC .... H04B 1/709; H04B 1/7085; H04B 1/7075; H04B 1/7095
USPC .................................. 375/142, 150, 327, 343
See application file for complete search history.

(56) References Cited

U.S. PATENT DOCUMENTS

| | | | | |
|---|---|---|---|---|
| 6,278,397 | B1 * | 8/2001 | Chiles ....................... | G01S 7/03 342/120 |
| 8,373,593 | B2 * | 2/2013 | Zhodzishsky et al. ... | 342/357.75 |
| 8,401,546 | B2 * | 3/2013 | Landry et al. ................. | 455/427 |
| 8,989,326 | B2 * | 3/2015 | An et al. ....................... | 375/350 |

(Continued)

*Primary Examiner* — Emmanuel Bayard
(74) *Attorney, Agent, or Firm* — NSIP Law

(57) ABSTRACT

A method of generating a correlation function for a CBOC (6,1,1/11) signal includes generating a first correlation function by performing a first elimination operation on a first and twelfth partial correlation function pair of 12 partial correlation functions, generating a fourth correlation function by performing a first elimination operation between second and third correlation functions that are generated by performing a second elimination operation between two difference functions between sixth and seventh partial correlation functions and the first correlation function, and generating a main correlation function by summing resulting waveforms that are generated by performing a first elimination operation between each of the 12 partial correlation functions and the fourth correlation function or by performing a first elimination operation between each of the remaining 8 partial correlation functions, excluding first, sixth, seventh and twelfth partial correlation functions from the 12 partial correlation functions, and the fourth correlation function.

11 Claims, 7 Drawing Sheets

(56) References Cited

U.S. PATENT DOCUMENTS

2009/0290660 A1* 11/2009 Neugebauer .................. 375/340
2015/0022397 A1* 1/2015 Manohar et al. ......... 342/357.63
2015/0091754 A1* 4/2015 Komaili et al. .......... 342/357.69
2015/0117499 A1* 4/2015 Chae et al. .................... 375/150
2015/0124919 A1* 5/2015 Chae et al. .................... 375/150
2015/0138016 A1* 5/2015 Chae et al. .................... 375/150
2015/0139282 A1* 5/2015 Chae et al. .................... 375/150

* cited by examiner

METHOD FOR GENERATING UNAMBIGUOUS CORRELATION FUNCTION FOR CBOC(6,1,1/11) SIGNAL BASED ON MULTI STAGE COMPOSITION OF PARTIAL CORRELATION FUNCTIONS, APPARATUS FOR TRACKING CBOC SIGNALS AND SATELLITE NAVIGATION SIGNAL RECEIVER SYSTEM

CROSS-REFERENCE TO RELATED APPLICATIONS

This application claims the benefit under 35 USC §119(a) of Korean Patent Application No. 10-2013-0140688 filed on Nov. 19, 2013, with the Korean Intellectual Property Office, the entire disclosure of which incorporated herein by reference for all purposes.

BACKGROUND

1. Technical Field

The present invention relates generally to satellite navigation technology and, more particularly, to a scheme for tracking a composite binary offset carrier (CBOC) signal that is used for satellite navigation technology.

2. Description of the Related Art

Satellite navigation technology is technology that is configured such that, when a plurality of navigation satellites randomly transmits a plurality of satellite navigation signals, each containing information about the current location and time of the corresponding navigation satellite, to the ground, a satellite navigation receiver on the ground receives the plurality of satellite navigation signals, calculates the coordinates of the current locations of the navigation satellites and the arrival times of the signals, and determines its three-dimensional (3D) location in the Earth coordinate system using triangulation.

A satellite navigation receiver theoretically requires at least three satellite signals in order to determine its longitude, latitude and height, and requires one more satellite signal in order to improve accuracy by eliminating time error between satellites. Accordingly, at least four satellites are required.

Across the world, many countries have developed independent satellite navigation systems for economic and military reasons. Although the United States Global Positioning System (GPS) is most widely used and famous, the European Union's Galileo system, the Russian GLONASS, the Chinese COMPASS system, and the Japanese QZSS system (which will be expanded to the JRANS system in the future) are also being currently operated or developed.

Since satellite navigation signals should be robust to interference and jamming, a variety of elaborate modulation schemes have been employed. It is worthy of notice that the majority of the next-generation satellite navigation systems have replaced a conventional a phase shift keying (PSK) modulation scheme or have employed a BOC modulation scheme in addition to a PSK modulation scheme. The width of the main peak of an autocorrelation function used for the BOC modulation scheme is short, and thus the BOC modulation scheme exhibits better signal tracking performance than the PSK modulation scheme.

Furthermore, the BOC modulation scheme is characterized in that spectral separation occurs and energy is shifted from the center of a band to the periphery thereof, unlike the PSK modulation scheme, and thus the BOC modulation scheme can be additionally applied to a band in which a conventional modulation scheme has been used. Using these characteristics, the next-generation satellite navigation systems can employ the BOC modulation scheme in addition to the PSK modulation scheme, thereby being able to ensure the improvement of performance and backward compatibility.

A BOC signal is a signal that is expressed as a product of a pseudo random noise (PRN) code with a sine or cosine rectangular sub-carrier. A BOC signal is expressed as a $BOC_{sin}(kn,n)$ or a $BOC_{cos}(kn,n)$ depending on the type of sub-carrier, where k is a positive integer indicative of the ratio of the chip period of a PRN code to the period of a sub-carrier, and n is indicative of the ratio of PRN code chip transmission rate to 1.023 MHz, that is, the clock frequency of a C/A code.

Although a BOC signal has high signal tracking performance and excellent compatibility with the conventional PSK modulation scheme, it is problematic in that many side peaks occur around a main peak where an autocorrelation function has the highest value, unlike the PSK scheme having a single peak. A problem in which, upon tracking a BOC signal, synchronization is established with a side peak instead of a main peak due to the presence of side peaks, that is, the so-called ambiguity problem, may occur.

Meanwhile, in order to modernize the GPS system while maintaining its backward compatibility and provide compatibility between the GPS system and the Galileo system, a multiplexed BOC (MBOC) modulation method was proposed, and the U.S. and European authorities finally decided to adopt a so-called MBOC(6,1,1/11) modulation method in which a $BOC_{sin}(1,1)$ signal and a $BOC_{sin}(6,1)$ signal were combined at a power split ratio of 1/11 after discussion.

Interestingly, the U.S. and European authorities implemented different methods of synthesizing sub-carrier signals BOC(1,1) and BOC(6,1) that could satisfy the power spectrum density of the MBOC(6,1,1/11) modulation method. First, the U.S. authority implemented a time-multiplexed BOC (CBOC) using two sub-carriers BOC(1,1) and BOC(6,1) in the time domain in an non-overlap manner. In contrast, the European authority implemented a composite BOC (CBOC) in which a sub-carrier BOC(6,1) has been added to a sub-carrier BOC(1,1) along the time axis.

A CBOC modulation scheme is a method of simply summing a $BOC_{sin}(1,1)$ and $BOC_{sin}(6,1)$ in a weighted manner so that the power spectrum density of an MBOC(6,1,1/11) modulation scheme can be satisfied.

Meanwhile, a decision was made such that 50% of the power of a CBOC(6,1,1/11) signal was assigned to each of data and a pilot. For this purpose, the overall signal is divided into a CBOC(6,1,1/11,'+') signal for the transmission of a data component and a CBOC(6,1,1/11,'−') signal for signal synchronization using a pilot component.

The peak of the autocorrelation function of the CBOC(6,1,1/11) signal is sharper thanks to the advantage of a BOC(6,1) signal component, and thus can provide more accurate positioning performance than a general BOC modulated signal.

However, since the CBOC(6,1,1/11) signal has various side peaks around a main peak like a general BOC modulated signal, it still has the ambiguity problem upon signal tracking.

Proposed conventional schemes for eliminating the side peaks of a CBOC autocorrelation function are schemes for applying a conventional method of eliminating side peaks in a BOC signal without change or schemes for eliminating side peaks using a newly designed local signal. Although these schemes can actually eliminate side peaks, tracking performance is not improved.

RELATED TECHNICAL DOCUMENTS

Non-Patent Documents (Non-patent document 1) [1] Z. Yao, M. Lu, and Z. Feng, "Unambiguous technique for multiplexed binary offset carrier modulated signals tracking," IEEE Signal Process., Lett., vol. 16, no. 7, pp. 608-611, July 2009

(Non-patent document 2) [2] Y. P. Lee and S. Yoon, "A side-peak cancellation scheme for CBOC code acquisition," International Journal of World Academy of Science, Engineering and Technology, vol. 69, pp. 685-687, September 2012.

SUMMARY

An object of the present invention is to provide a method of generating an unambiguous correlation function for a CBOC (6,1,1/11) signal, an apparatus for tracking a CBOC signal, and a satellite navigation signal receiver system using the same.

An object of the present invention is to provide a method of generating an unambiguous correlation function for a CBOC (6,1,1/11) signal based on the multistage composition of partial correlation functions constituting a CBOC signal, an apparatus for tracking a CBOC signal, and a satellite navigation signal receiver system using the same.

An object of the present invention is to provide a method of generating an unambiguous correlation function based on partial correlation functions, an apparatus for tracking a CBOC signal, and a satellite navigation signal receiver system using the same, which have been developed based on the unique characteristics of a CBOC signal without using a conventional correlation function generation scheme developed for a BOC signal.

The objects of the present invention are not limited to the above-described objects, and other objects that have not been described above will be clearly understood by those skilled in the art from the following description.

In accordance with an aspect of the present invention, there is provided a delay locked loop (DLL), including:

a local signal generation unit configured to generate an early and late delayed signal pair $r(t+\tau+\Delta/2)$ and $r(t+\tau-\Delta/2)$, early and late delayed, respectively, based on a phase delay $\tau$ and a delay value difference, with respect to a signal pulse train of a CBOC(6,1,1/11)-modulated received signal $r(t)$;

early and late autocorrelation units configured to generate first to twelfth early partial correlation functions $\{C_m(\tau+\Delta/2)\}_{m=0}^{11}$ and first to twelfth late partial correlation functions $\{C_m(\tau-\Delta/2)\}_{m=0}^{11}$ by performing an autocorrelation operation of an early and late mixing signal pair with respect to the total time $T(0 \le t \le T)$;

early and late first correlation function generation units configured to generate an early first correlation function $R_0(\tau+\Delta/2)$ by performing a first elimination operation on first and twelfth early partial correlation functions $C_0(\tau+\Delta/2)$ and $C_{11}(\tau+\Delta/2)$ and to generate a late first correlation function $R_0(\tau-\Delta/2)$ by performing a first elimination operation on first and twelfth early partial correlation functions $C_0(\tau-\Delta/2)$ and $C_{11}(\tau-\Delta/2)$;

an early fourth correlation function generation unit configured to generate early second and third correlation functions $R_1(\tau+\Delta/2)$ and $R_2(\tau+\Delta/2)$ by performing second elimination operations between each of the two difference waveforms of the early sixth and seventh partial correlation functions $C_5(\tau+\Delta/2)$ and $C_6(\tau+\Delta/2)$ of the first to twelfth early partial correlation functions $\{C_m(\tau+\Delta/2)\}_{m=0}^{11}$ and an early first correlation function $R_0(\tau+\Delta/2)$, and to acquire an early fourth correlation function $R_3(\tau+\Delta/2)$ by performing a first elimination operation on the early second and third correlation functions $R_1(\tau+\Delta/2)$ and $R_2(\tau+\Delta/2)$;

a late fourth correlation function generation unit configured to generate late second and third correlation functions $R_1(\tau-\Delta/2)$ and $R_2(\tau-\Delta/2)$ by performing second elimination operations between each of the two difference waveforms of the late sixth and seventh partial correlation functions $C_5(\tau-\Delta/2)$ and $C_6(\tau-\Delta/2)$ of the first to twelfth late partial correlation functions $\{C_m(\tau-\Delta/2)\}_{m=0}^{11}$ and a late first correlation function $R_0(\tau-\Delta/2)$, and to acquire a late fourth correlation function $R_3(\tau-\Delta/2)$ by performing a first elimination operation on the late second and third correlation functions $R_1(\tau-\Delta/2)$ and $R_2(\tau-\Delta/2)$;

early and late combination units configured to acquire the early main correlation function $R_{proposed}(\tau+\Delta/2)$ by summing results of an elimination operation between the early fourth correlation function $R_3(\tau+\Delta/2)$ and 8 early partial correlation functions $\{C_m(\tau+\Delta/2)\}_{m=1}^{4}$ and $\{C_m(\tau+\Delta/2)\}_{m=7}^{10}$ and the early fourth correlation function $R_3(\tau+\Delta/2)$, and to acquire the late main correlation function $R_{proposed}(\tau-\Delta/2)$ by summing results of an elimination operation between the late fourth correlation function $R_3(\tau-\Delta/2)$ and 8 late partial correlation functions $\{C_m(\tau-\Delta/2)\}_{m=1}^{4}$ and $\{C_m(\tau-\Delta/2)\}_{m=7}^{10}$ and the late fourth correlation function $R_3(\tau-\Delta/2)$; and a numerical control oscillator (NCO) configured to determine a phase delay $\tau$ of a delayed signal for the received signal based on values of the early and late main correlation functions, and to output the determined phase delay $\tau$ to the local signal generation unit;

wherein the first elimination operation is an operation that satisfies algebraic relations in which $|A|+|B|-|A-B|=0$ if real numbers A and B satisfy $AB \le 0$ and $|A|+|B|-|A-B|>0$ if real numbers A and B satisfy $AB>0$; and wherein the second elimination operation is an operation that performs $|A+B|-|A|$ with respect to real numbers A and B.

According to an embodiment, the early partial correlation functions $\{C_m(\tau+\Delta/2)\}_{m=0}^{11}$ and the late partial correlation functions $\{C_m(\tau-\Delta/2)\}_{m=0}^{11}$ may be based on the following equation:

$$R(\tau) = \frac{1}{PT}\int_0^T r(t)r(t+\tau)dt$$

$$= \sum_{m=0}^{11}\left\{\sum_{n=0}^{T/T_c-1}\frac{1}{PT}\int_{(12m+n)T_c}^{(12m+n+1)T_c} r(t)r(t+\tau)dt\right\}$$

$$= \sum_{m=0}^{11} C_m(\tau)$$

where $R(\tau)$ is an autocorrelation function, P is power of the received signal $r(t)$, T is a period of pseudo noise code, and $T_c$ is a period of a chip.

According to an embodiment, the early first correlation function $R_0(\tau+\Delta/2)$ and the late first correlation function $R_0(\tau-\Delta/2)$ may be generated based on the following Equation:

$$R_0(\tau) = C_0(\tau)C_{11}(\tau)$$

$$|C_0(\tau)|+|C_{11}(\tau)|-|C_0(\tau)-C_{11}(\tau)|$$

According to an embodiment,
the early main correlation function combination unit may operate to acquire the early main correlation function $R_{proposed}(\tau+\Delta/2)$ by summing results of an elimination operation between the early fourth correlation function $R_3(\tau+\Delta/2)$ and 12 early partial correlation functions $\{C_m(\tau+\Delta/2)\}_{m=0}^{11}$ and the early fourth correlation function $R_3(\tau+\Delta/2)$; and the late main correlation function combination unit may operate to acquire the late main correlation function $R_{proposed}(\tau-\Delta/2)$ by summing results of an elimination operation between the late fourth correlation function $R_3(\tau-\Delta/2)$ and 12 late partial correlation functions $\{C_m(\tau-\Delta/2)\}_{m=0}^{11}$ and the late fourth correlation function $R_3(\tau-\Delta/2)$.

According to an embodiment, the discrimination function may be defined by the following equation:

$$D(\tau) = R_{proposed}^2\left(\tau + \frac{\Delta}{2}\right) - R_{proposed}^2\left(\tau - \frac{\Delta}{2}\right)$$

In accordance with another aspect of the present invention, there is provided a method of tracking a CBOC(6,1,1/11) signal, including:

generating an early and late delayed signal pair $r(t+\tau+\Delta/2)$ and $r(t+\tau-\Delta/2)$, early and late delayed, respectively, based on a phase delay $\tau$ and a delay value difference, with respect to a signal pulse train of a CBOC(6,1,1/11)-modulated received signal $r(t)$;

generating first to twelfth early partial correlation functions $\{C_m(\tau+\Delta/2)\}_{m=0}^{11}$ and first to twelfth late partial correlation functions $\{C_m(\tau-\Delta/2)\}_{m=0}^{11}$ by performing an autocorrelation operation of the early and late delayed signal pair with respect to the total time $T(0 \leq t \leq T)$;

generating an early first correlation function $R_0(\tau+\Delta/2)$ by performing a first elimination operation on first and twelfth early partial correlation functions $C_0(\tau+\Delta/2)$ and $C_{11}(\tau+\Delta/2)$, and generating a late first correlation function $R_0(\tau-\Delta/2)$ by performing a first elimination operation on first and twelfth early partial correlation functions $C_0(\tau-\Delta/2)$ and $C_{11}(\tau-\Delta/2)$;

generating early second and third correlation functions $R_1(\tau+\Delta/2)$ and $R_2(\tau+\Delta/2)$ by performing second elimination operations between each of the two difference waveforms of the early sixth and seventh partial correlation functions $C_5(\tau+\Delta/2)$ and $C_6(\tau+\Delta/2)$ of the first to twelfth early partial correlation functions $\{C_m(\tau+\Delta/2)\}_{m=0}^{11}$ and an early first correlation function $R_0(\tau+\Delta/2)$, and acquiring an early fourth correlation function $R_3(\tau+\Delta/2)$ by performing a first elimination operation on the early second and third correlation functions $R_1(\tau+\Delta/2)$ and $R_2(\tau+\Delta/2)$; and generating late second and third correlation functions $R_1(\tau-\Delta/2)$ and $R_2(\tau-\Delta/2)$ by performing second elimination operations between each of the two difference waveforms of the late sixth and seventh partial correlation functions $C_5(\tau-\Delta/2)$ and $C_6(\tau-\Delta/2)$ of the first to twelfth late partial correlation functions $\{C_m(\tau-\Delta/2)\}_{m=0}^{11}$ and a late first correlation function $R_0(\tau-\Delta/2)$, and acquiring a late fourth correlation function $R_3(\tau-\Delta/2)$ by performing a first elimination operation on the late second and third correlation functions $R_1(\tau-\Delta/2)$ and $R_2(\tau-\Delta/2)$;

acquiring an early main correlation function $R_{proposed}(\tau+\Delta/2)$ by summing results of an elimination operation between the early fourth correlation function $R_3(\tau+\Delta/2)$ and 12 early partial correlation functions $\{C_m(\tau+\Delta/2)\}_{m=0}^{11}$ and the early fourth correlation function $R_3(\tau+\Delta/2)$, and acquiring a late main correlation function $R_{proposed}(\tau-\Delta/2)$ by summing results of an elimination operation between a late fourth correlation function $R_3(\tau-\Delta/2)$ and 12 late partial correlation functions $\{C_m(\tau-\Delta/2)\}_{m=0}^{11}$ and the late fourth correlation function $R_3(\tau-\Delta/2)$; and determining a phase delay $\tau$ of a delayed signal for the received signal based on values of the early and late main correlation functions, and outputting the determined phase delay $\tau$;

wherein the first elimination operation is an operation that satisfies algebraic relations in which $|A|+|B|-|A-B|=0$ if real numbers A and B satisfy $AB \leq 0$ and $|A|+|B|-|A-B|>0$ if real numbers A and B satisfy $AB > 0$; and wherein the second elimination operation is an operation that performs $|A+B|-|A|$ with respect to real numbers A and B.

According to an embodiment, the early main correlation function $R_{proposed}(\tau+\Delta/2)$ may be acquired by summing results of an elimination operation between the early fourth correlation function $R_3(\tau+\Delta/2)$ and 12 early partial correlation functions $\{C_m(\tau+\Delta/2)\}_{m=0}^{11}$ and the early fourth correlation function $R_3(\tau+\Delta/2)$; and the late main correlation function $R_{proposed}(\tau-\Delta/2)$ may be acquired by summing results of an elimination operation between a late fourth correlation function $R_3(\tau-\Delta/2)$ and 12 late partial correlation functions $\{C_m(\tau-\Delta/2)\}_{m=0}^{11}$ and the late fourth correlation function $R_3(\tau-\Delta/2)$.

In accordance with still another aspect of the present invention, there is provided a method of generating the correlation function of a CBOC(6,1,1/11) signal, including:

generating a signal $r(t+\tau)$ delayed based on a phase delay 2 with respect to a signal pulse train of a CBOC(6,1,1/11)-modulated received signal $r(t)$;

generating first to twelfth partial correlation functions $\{C_m(\tau)\}_{m=0}^{11}$ performing an autocorrelation operation of the received signal $r(t)$ and the delayed signal $r(t+\tau)$ with respect to the total time $T(0 \leq t \leq T)$;

generating an early first correlation function $R_0(\tau)$ by performing a first elimination operation on first and twelfth partial correlation functions $C_0(\tau)$ and $C_{11}(\tau)$;

generating second and third correlation functions $R_1(\tau)$ and $R_2(\tau)$ by performing a second elimination operation between each of the two difference waveforms of sixth and seventh partial correlation functions $C_5(\tau)$ and $C_6(\tau)$ of first to twelfth partial correlation functions $\{C_m(\tau)\}_{m=0}^{11}$ and a first correlation function $R_0(\tau)$, and acquiring a fourth correlation function $R_3(\tau)$ by performing a first elimination operation on the second and third correlation functions $R_1(\tau)$ and $R_2(\tau)$; and acquiring a main correlation function $R_{proposed}(\tau)$ by summing the results of an elimination operation between the fourth correlation function $R_3(\tau)$ and each of 8 partial correlation functions $\{C_m(\tau)\}_{m=1}^{4}$, and $\{C_m(\tau)\}_{m=7}^{10}$, and the fourth correlation function $R_3(\tau)$;

wherein the first elimination operation is an operation that satisfies algebraic relations in which $|A|+|B|-|A-B|=0$ if real numbers A and B satisfy $AB \leq 0$ and $|A|+|B|-|A-B|>0$ if real numbers A and B satisfy $AB > 0$; and wherein the second elimination operation is an operation that performs $|A+B|-|A|$ with respect to real numbers A and B.

According to an embodiment, the main correlation function $R_{proposed}(\tau)$ may be acquired by summing the results of an elimination operation between the fourth correlation function $R_3(\tau)$ and 12 partial correlation functions $\{C_m(\tau)\}_{m=0}^{11}$, and the fourth correlation function $R_3(\tau)$.

In accordance with still another aspect of the present invention, there is provided an apparatus for tracking a CBOC signal, including:

a frequency offset compensation unit configured to output a compensated received signal compensated for frequency offset of a carrier frequency based on a carrier frequency compensation value with respect to a CBOC(6,1,1/11)-modulated received signal;

a local code generation unit configured to generate a delay-compensated local code based on a code delay value;

a mixer configured to mix the delay-compensated local code with the frequency offset-compensated received signal;

a DLL configured to repeatedly track and calculate a code delay value that allows a correlation value obtained by correlating the delay-compensated local signal and the frequency offset-compensated received signal with each other is located at an apex of a main peak of a correlation function, and to provide the calculated code delay value to the local code generation unit;

a phase lock loop (PLL) configured to repeatedly calculate a carrier frequency compensation value based on an autocorrelation value of a local code, based on the tracked code delay value, so that a phase error of a carrier signal can be minimized, and to provide the carrier frequency compensation value to the frequency offset compensation unit; and a data extraction unit configured to extract spreading data from a mixture of the delay-compensated local code and the compensated received signal;

wherein the DLL operates to:

generate a first correlation function by performing a first elimination operation on a first and twelfth partial correlation function pair of 12 partial correlation functions constituting an autocorrelation function of the CBOC(6,1,1/11)-modulated received signal; generate a fourth correlation function by performing a first elimination operation between second and third correlation functions that are generated by performing a second elimination operation between two difference functions between sixth and seventh partial correlation functions and the first correlation function; and then sum resulting waveforms that are generated by performing a first elimination operation between each of the 12 partial correlation functions and the fourth correlation function or by performing a first elimination operation between each of the remaining 8 partial correlation functions, excluding first, sixth, seventh and twelfth partial correlation functions from the 12 partial correlation functions, and the fourth correlation function, thereby generating a main correlation function;

wherein the first elimination operation is an operation that satisfies algebraic relations in which |A|+|B|−|A−B|=0 if real numbers A and B satisfy AB≤0 and |A|+|B|−|A−B|>0 if real numbers A and B satisfy AB>0; and wherein the second elimination operation is an operation that performs |A+B|−|A| with respect to real numbers A and B.

In accordance with still another aspect of the present invention, there is provided a satellite navigation signal receiver system, including:

a front end unit configured to output a received signal obtained by CBOC(6,1,1/11)-modulating a signal in space (SIS) received from an antenna;

a baseband processing unit configured to acquire and track a code delay value with respect to the output received signal using a DLL, to compensate for carrier frequency offset using a PLL, and to extract satellite navigation data from a code delay-compensated local code and a frequency offset-compensated received signal; and a navigation function processing unit configured to estimate a pseudorange based on the extracted satellite navigation data;

wherein the baseband processing unit operates to:

generate a first correlation function by performing a first elimination operation on a first and twelfth partial correlation function pair of 12 partial correlation functions constituting an autocorrelation function of the CBOC(6,1,1/11)-modulated received signal;

generate a fourth correlation function by performing a first elimination operation between second and third correlation functions that are generated by performing a second elimination operation between two difference functions between sixth and seventh partial correlation functions and the first correlation function;

generate a main correlation function by summing resulting waveforms that are generated by performing a first elimination operation between each of the 12 partial correlation functions and the fourth correlation function or by performing a first elimination operation between each of the remaining 8 partial correlation functions, excluding first, sixth, seventh and twelfth partial correlation functions from the 12 partial correlation functions, and the fourth correlation function; and determine a phase delay of a delayed signal for the received signal based on the main correlation function;

wherein the first elimination operation is an operation that satisfies algebraic relations in which |A|+|B|−|A−B|=0 if real numbers A and B satisfy AB≤0 and |A|+|B|−|A−B|>0 if real numbers A and B satisfy AB>0; and wherein the second elimination operation is an operation that performs |A+B|−|A| with respect to real numbers A and B.

The present invention provides the method of generating an unambiguous correlation function for a CBOC(6,1,1/11) signal, the apparatus for tracking a CBOC signal, and the satellite navigation signal receiver system using the same. These apparatus and the method can overcome the disadvantage of conventional CBOC signal tracking schemes in which the advantages of a BOC(6,1) signal cannot be utilized, and thus can be applied to a CBOC(6,1,1/11) signal.

The present invention provides the method of generating an unambiguous correlation function for a CBOC(6,1,1/11) signal, the apparatus for tracking a CBOC signal, and the satellite navigation signal receiver system using the same. These apparatus and the method can completely eliminate side peaks, and the proposed unambiguous correlation function is considerably sharper and higher than the autocorrelation function.

The advantages of the present invention are not limited to the above-described advantages, and other advantages that have not been described above will be clearly understood by those skilled in the art from the following description.

DETAILED DESCRIPTION

Figure 1:
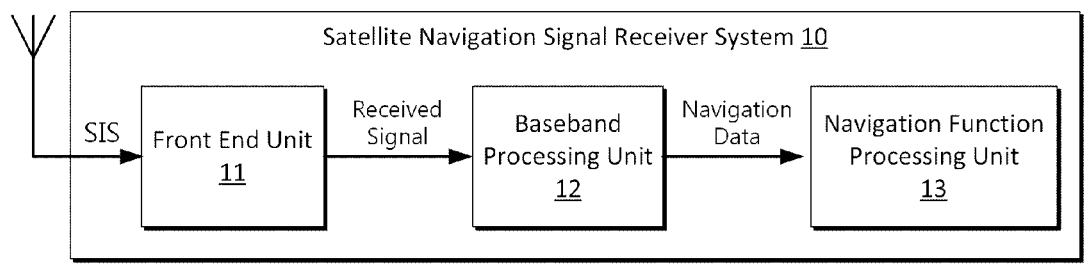
FIG. 1 is a block diagram illustrating a satellite navigation signal receiver system according to an embodiment of the present invention.

With regard to embodiments of the present invention disclosed herein, specific structural and functional descriptions are given merely for the purpose of illustrating the embodiments of the present invention. Embodiments of the present invention may be practiced in various forms, and the present invention should not be construed as being limited to embodiments disclosed herein.

Embodiments of the present invention will be described in detail below with reference to the accompanying drawings. The same reference numerals will be used to denote the same components throughout the accompanying drawings, and descriptions of the same components will be omitted.

FIG. 1 is a block diagram illustrating a satellite navigation signal receiver system 10 according to an embodiment of the present invention.

Referring to FIG. 1, the satellite navigation signal receiver system 10 includes an antenna, a front end unit 11, a baseband processing unit 12, and a navigation function processing unit 13.

A signal in space (SIS) emitted from a navigation satellite and received by the antenna is subjected to tuning, down conversion, filtering, amplification, and digital sampling by the front end unit 11, and is then output as a digital received signal.

The baseband processing unit 12 may acquire and track code delay using a delay lock loop (DLL) for acquiring and tracking signal synchronization based on a signal correlation scheme with respect to the output received signal, may compensate for carrier frequency offset using a phase lock loop (PLL) in order to compensate for the fading or Doppler effect, and may extract synchronized satellite navigation data from a code delay-compensated local signal and a frequency offset-compensated received signal.

In particular, the baseband processing unit 12 may generate the pseudorange from the satellite to the satellite navigation signal receiver system 10 based on the satellite navigation data, and may output the pseudorange.

Furthermore, the baseband processing unit 12 may extract phase measurement data, satellite location data (almanac), satellite clock information, satellite orbit data (ephemeris), etc. from the compensated received signal, in addition to the pseudorange.

In this case, as will be described below, the baseband processing unit 12 of the satellite navigation signal receiver system 10 according to the present embodiment may generate a first correlation function by performing a first elimination operation on the first and twelfth partial correlation function pair of 12 partial correlation functions constituting the autocorrelation function of a CBOC(6,1,1/11)-modulated received signal, may generate a fourth correlation function by performing a first elimination operation between second and third correlation functions that are generated by performing a second elimination operation between two difference functions between sixth and seventh partial correlation functions and the first correlation function, and may generate a main correlation function by summing resulting waveforms that are generated by performing a first elimination operation between each of the 12 partial correlation functions and the fourth correlation function or by performing a first elimination operation between each of the remaining 8 partial correlation functions, excluding first, sixth, seventh and twelfth partial correlation functions from the 12 partial correlation functions, and the fourth correlation function. Then the baseband processing unit 12 may accurately acquire and track a code phase delay based on the main correlation function having only a main peak.

The navigation function processing unit 13 may calculate the coordinates and movement of the receiver system 10 based on pseudoranges obtained for a plurality of satellites.

In this case, for example, the navigation function processing unit 13 may calculate the 2D coordinates of the satellites navigation receiver system 10 from the pseudoranges obtained for three satellites, and may calculate 3D coordinates from the pseudoranges obtained for at least four satellites.

Figure 2:
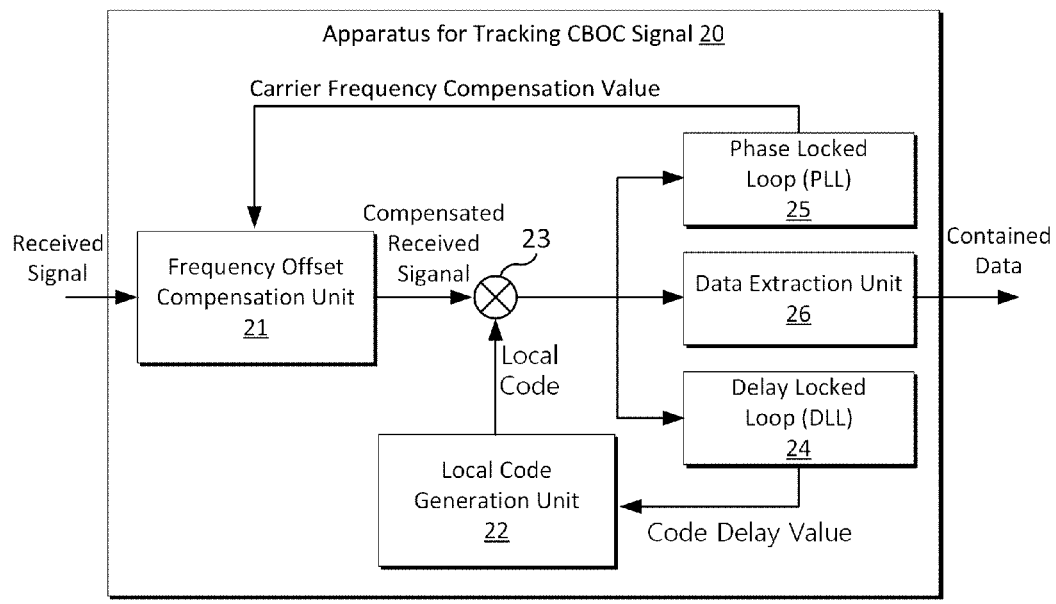
FIG. 2 is a block diagram illustrating an apparatus for tracking a CBOC signal according to an embodiment of the present invention.

FIG. 2 is a block diagram illustrating an apparatus for tracking a CBOC signal according to an embodiment of the present invention.

The baseband processing unit 12 of the satellite navigation signal receiver system 10 of FIG. 1 may acquire and track code delay using circuits, such as an apparatus 20 for tracking a CBOC signal illustrated in FIG. 2.

Referring to FIG. 2, the apparatus 20 for tracking a CBOC signal may include a frequency offset compensation unit 21, a local code generation unit 22, a mixer 23, a DLL 24, a PLL 25, and a data extraction unit 26.

When the apparatus 20 for tracking a CBOC signal receives a CBOC received signal, it takes time for the CBOC received signal to reach the receiver system 10, and carrier frequency offset occurs during propagation due to the fading or Doppler effect. Accordingly, in order to accurately track and demodulate the CBOC received signal, a code delay value and carrier frequency offset should be known.

Since it is impossible to know a code delay value and a frequency offset value or they should be inaccurately estimated when a CBOC signal is received first, the code delay value should be determined or a carrier frequency should be compensated via the DLL 24 or PLL 25.

First, the frequency offset compensation unit 21 outputs a compensated received signal obtained by compensating the CBOC received signal for carrier frequency fading or frequency offset attributable to the Doppler effect based on a carrier frequency compensation value provided by the PLL 25. Since there is no information used to compensate for calculated carrier frequency offset in the beginning stage, a default value or a previous estimated value may be applied.

The local code generation unit 22 generates a delay-compensated local code based on a code delay value that is calculated by the DLL 24. Since there is no calculated code delay value in the beginning stage, a default value or a previous estimated value may be applied.

The mixer 23 mixes the delay-compensated local code and the frequency deviation-compensated received signal.

The DLL 24 repeatedly tracks and calculates a code delay value that allows a correlation value, obtained by performing a predetermined correlation operation on the delayed received signal based on the compensated received signal and a predetermined code delay value, to be located at the main peak of a main correlation function, and provides the calculated code delay value to the local code generation unit 22.

More specifically, as will be described in detail later, the DLL 24 may generate a first correlation function by performing a first elimination operation on the first and twelfth partial correlation function pair of 12 partial correlation functions constituting the autocorrelation function of a CBOC(6,1,1/11)-modulated received signal, may generate a fourth correlation function by performing a first elimination operation between second and third correlation functions that are generated by performing a second elimination operation between two difference functions between sixth and seventh partial correlation functions and the first correlation function, and may sum resulting waveforms that are generated by performing a first elimination operation between each of the 12 partial correlation functions and the fourth correlation function or by performing a first elimination operation between each of the remaining 8 partial correlation functions, excluding first, sixth, seventh and twelfth partial correlation functions from the 12 partial correlation functions, and the fourth correlation function, thereby generating a main correlation function.

In this case, as will be described in connection with Equations 5 and 6 later, throughout the present specification and the attached claims, a first elimination operation refers to an operation based on algebraic relations in which $|A|+|B|-|A-B|=0$ if real numbers A and B satisfy $AB \leq 0$ and $|A|+|B|-|A-B|>0$ if the real numbers A and B satisfy $AB>0$.

Furthermore, as will be described in connection with Equation 7 later, throughout the present specification and the attached claims, a second elimination operation refers to an operation that performs $|A+B|-|A|$ with respect to real numbers A and B.

The main correlation function according to the present invention can eliminate all side peaks, other than a main peak, and is sharper at its center and has a main peak having a larger height than an autocorrelation function, thereby being able to improve tracking performance.

The PLL 25 repeatedly compensates a carrier frequency based on the autocorrelation value of the local code, based on the tracked code delay value, so that the phase error of a carrier signal can be minimized, and then provides a carrier frequency compensation value to the frequency offset compensation unit 21.

After the compensated received signal has been appropriately acquired and tracked, the data extraction unit 26 may accurately extract synchronized data, such as satellite navigation data modulated into a PRN code on a satellite side, from a mixture of the delay-compensated local code and the frequency deviation-compensated received signal.

Furthermore, the data extraction unit 26 may estimate the pseudorange to the satellite based on the extracted satellite navigation data.

Figure 3:
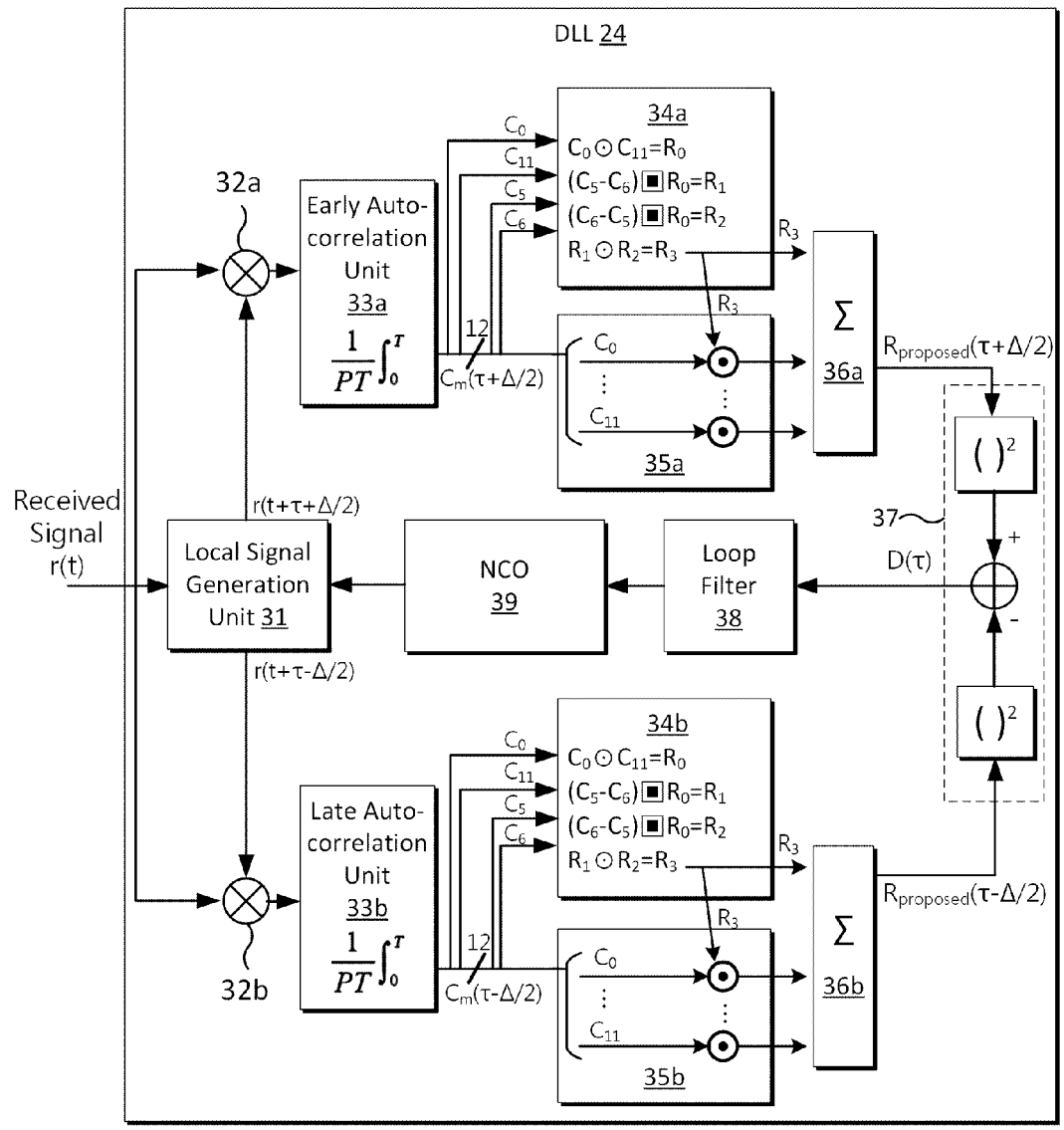
FIG. 3 is a block diagram illustrating the Delay Locked Loop (DLL) of the apparatus for tracking a CBOC signal according to the present embodiment.

FIG. 3 is a block diagram illustrating the DLL of the apparatus for tracking a CBOC signal according to the present embodiment.

More specifically, the DLL 24 includes a local signal generation unit 31, early and late mixers 32a and 32b, early and late autocorrelation units 33a and 33b, early and late first correlation function generation units 34a and 34b, early and late fourth correlation function generation units 35a and 35b, early and late combination units 36a and 36b, a discriminator mixer 37, a loop filter 38, and a numerical control oscillator (NCO) 39.

The conventional apparatus for tracking a BOC signal performs a correlation operation on priori known spreading codes, provided by the local signal generation unit, and the received signal and then acquire a spreading code having the largest correlation value and its synchronization, at the step of acquiring the spreading code of the BOC signal and its synchronization; and outputs the delayed received signal via a local code generation unit, performs autocorrelation on the delayed received signal and the received signal, and then finds a code delay phase that exhibits a main peak having the largest correlation value, at the step of tracking code delay after the acquisition.

As described above, the autocorrelation function of a CBOC signal has a plurality of side peaks. In order to overcome this problem, first, the early and late first correlation function generation units 34a and 34b of the present invention acquire early and late first correlation functions by performing first elimination operations on early sixth and seventh partial correlation functions and late sixth and seventh partial correlation functions constituting the autocorrelation function of the received signal.

Thereafter, the early fourth correlation function generation unit 35a of the present invention generates early second and third correlation functions by performing second elimination operations between each of the two difference waveforms of the early sixth and seventh partial correlation functions of 12 early partial correlation functions constituting the early autocorrelation function of the received signal, i.e., each of a waveform obtained by subtracting the early seventh partial correlation function from the early sixth partial correlation function and a waveform obtained by subtracting the early sixth partial correlation function from the early seventh partial correlation function, and an early first correlation function, and acquires an early fourth correlation function by performing a first elimination operation on the early second and third correlation functions.

In the same manner, the late fourth correlation function generation unit 35b of the present invention generates late second and third correlation functions by performing second elimination operations between each of the two difference waveforms of the late sixth and seventh partial correlation functions of 12 late partial correlation functions constituting the late autocorrelation function of the received signal, i.e., each of a waveform obtained by subtracting the late seventh partial correlation function from the late sixth partial correlation function and a waveform obtained by subtracting the late sixth partial correlation function from the late seventh partial correlation function, and a late first correlation function, and acquires a late fourth correlation function by performing a first elimination operation on the late second and third correlation functions.

Next, the early and late combination units 36a and 36b of the present invention superpose the early and late fourth correlation functions and each of 12 early and late partial correlation functions or 8 early and late partial correlation functions in an embodiment, and may provide early and late main correlation functions having only main peaks.

In this case, the autocorrelation operation refers to an operation that multiplies a sampled signal X(t+τ) by a signal X(t) while gradually changing the delay time τ of the signal X(r) with respect to the signal X(t). Generally, when the signal X(t) repeats a specific pattern, the autocorrelation value of the signals X(t) and the X(t+τ) appears to be considerably large if the delay time τ is equal to the period of the pattern and appears to be small (that is, the correlation function appears in the form of a peak) if the delay time τ is not equal to the period of the pattern. Accordingly, when time delay for which the result of the autocorrelation operation appears to be largest is found, the value of the found time delay is the period of the signal X(t).

If a signal X(t) is a preamble indicative of the start of a synchronized signal, signal synchronization may be coarsely acquired using an autocorrelation operation.

Furthermore, after the signal synchronization has been acquired, signal synchronization may be finely tracked via an autocorrelation operation.

In general, there are some schemes for tracking the apex of the peak of a correlation function. For example, there is a scheme using the aspect of changes in the values of prompt correlation based on currently applied delay time, early correlation preceding the prompt correlation, and late correlation following the prompt correlation.

For example, if correlation values appear in order of early correlation, prompt correlation and late correlation or in reverse order, the prompt correlation may be viewed as being located on a slope of a peak. If the correlation value of prompt correlation is highest and the values of early correlation and late correlation are lower than the former value, this means that the prompt correlation is located near the apex of a peak.

As described above, in the CBOC(6,1,1/11) modulation scheme, 50% of power is assigned to a data signal component, and 50% of power is assigned to a pilot signal component. The data signal component uses a CBOC(6,1,1/11,'+') signal, whereas the pilot signal component uses a CBOC(6,1,1/11,'−') signal. Although the following scheme is substantially based on the CBOC(6,1,1/11,'−') signal because a synchronization operation is based on a pilot signal component, the following scheme may be theoretically applied to the CBOC(6,1,1/11,'+') signal in the same manner. Throughout the present specification, the CBOC(6,1,1/11) signal refers to a CBOC(6,1,1/11,'−') signal unless otherwise specified.

A CBOC(6,1,1/11) modulated baseband received signal r(t) may be expressed by the following Equation 1:

$$r(t) = \sqrt{S} \sum_{i=-\infty}^{\infty} p_i r_{T_c}(t - iT_c) d(t) c_{sc}(t) \quad (1)$$

where S is the power of a CBOC-modulated received signal, $p_i \in \{-1,1\}$ is the i-th chip of a code, for example, a PRN code, having a period T, $T_c$ is the period of a PRN code chip, $r_{T_c}(t)$ is a unit square wave present in $[0,T_c]$, and d(t) is navigation data. Meanwhile, a pilot signal component does not have data, and thus the navigation data d(t) is considered to be 1.

$c_{sc}(t)$ is the waveform of a sub-carrier that is present in a single PRN code chip of the CBOC(6,1,1/11, '−') signal. Since the PRN code chip in the CBOC(6,1,1/11,'−') signal is modulated in such a way that a BOC(6,1) signal is added to a BOC(1,1) signal by a simple additive weighting method as described above, the sub-carrier $c_{sc}(t)$ may be expressed by the following Equations 2 and 3 when BOC(1,1) and BOC(6,1) sub-carrier components constituting the sub-carrier $c_{sc}(t)$ are $c_{sc(1,1)}(t)$ and $c_{sc(6,1)}(t)$, respectively, as in the following Equation 3:

$$c_{sc}(t) = \sqrt{\frac{10}{11}} c_{sc(1,1)}(t) - \sqrt{\frac{1}{11}} c_{sc(6,1)}(t) \quad (2)$$

$$c_{sc(1,1)}(t) = \sum_{m=0}^{11} (-1)^{\lfloor m/6 \rfloor} r_{T_s}(t - iT_c - mT_s) \quad (3)$$

$$c_{sc(6,1)}(t) = \sum_{m=0}^{11} (-1)^m r_{T_s}(t - iT_c - mT_s)$$

where $\lfloor x \rfloor$ is a floor function and the largest integer equal to or smaller than x, and $T_s$ is a single pulse period of the BOC(6,1) sub-carrier waveform and $T_s = T_c/12$.

In Equations 2 and 3, the sub-carrier $c_{sc}(t)$ is generated by adding the BOC(6,1) signal having a shorter period and a larger size to the BOC(1,1) signal having a longer period and a smaller size. The BOC(1,1) signal is composed of positive and negative pulses having a period of $T_c/2$ and relatively large sizes, and the BOC(6,1) signal is composed of positive and negative pulses having a period $T_s = T_c/12$ and relatively small sizes.

Accordingly, the CBOC(6,1,1/11,'−') signal appears in a waveform in which three sawteeth have been attached to each of the relatively large positive and negative pulses and thus a total of six sawteeth have been attached to the relatively large positive and negative pulses. In this case, a single waveform appearing to be a sawtooth is a waveform that appears when positive and negative pulses each having a period $T_s$ successively appear.

Accordingly, when the sub-carrier of each period $T_c$ of the CBOC(6,1,1/11,'−') signal is viewed as a train of 12 successive partial sub-carrier pulses having the sub-carrier period $T_s$ of the BOC(6,1) signal and irregularly varying sizes, the sub-carrier $c_{sc}(t)$ of a single period $T_c$ of the CBOC(6,1,1/11,'−') signal may be represented by the time series sum of 12 partial sub-carrier pulses.

If the length T of the received CBOC(6,1,1/11,'−') signal is considerably longer than the chip period $T_c$, the received signal r(t) may be considered to be the sum of 12 partial received signals acquired by extracting an m-th (0≤m≤11) pulse location pulse from among 12 partial sub-carrier pulses, present within each chip period $T_c$, in the chip period $T_s$.

In other words, a first partial received signal is a pulse train including only pulses at the first (m=0) pulse locations of respective chips and having a length of $T/T_c$, and a second partial received signal is a pulse train including only pulses at the second (m=1) pulse locations of respective chips and having a length of $T/T_c$. A twelfth, that is, last, partial received signal is a pulse train including only pulses at the last (m=11) pulse locations of respective chips and a length of $T/T_c$.

Accordingly, an autocorrelation function R(τ) may be represented by the superposition of the results of autocorrelation operations based on 12 partial received signals including pulses at each pulse location of the received signal r(t), that is, the 12 partial correlation functions, as in the following Equation 4:

$$R(\tau) = \frac{1}{PT} \int_0^T r(t)r(t+\tau)\,dt \quad (4)$$

$$= \sum_{m=0}^{11} \left\{ \sum_{n=0}^{T/T_c-1} \frac{1}{PT} \int_{(12m+n)T_c}^{(12m+n+1)T_c} r(t)r(t+\tau)\,dt \right\}$$

$$= \sum_{m=0}^{11} C_m(\tau)$$

where P is the power of the received signal r(t), and T is the period of the pseudo noise code. It is assumed that symbols +1 and −1 appear at the same probability distribution in a chip of pseudo noise code, and the period T of the pseudo noise code may be viewed as being considerably longer than the chip period $T_c$. In Equation 4, $C_m(\tau)$ is the m-th partial correlation function of the 12 partial correlation functions based on the autocorrelation of the 12 partial received signals. It can be seen that the partial correlation function $C_m(\tau)$ can be obtained by dividing time by $T_s$ and then performing the autocorrelation operation of the CBOC received signal during each period of $T_s$.

Figure 4:
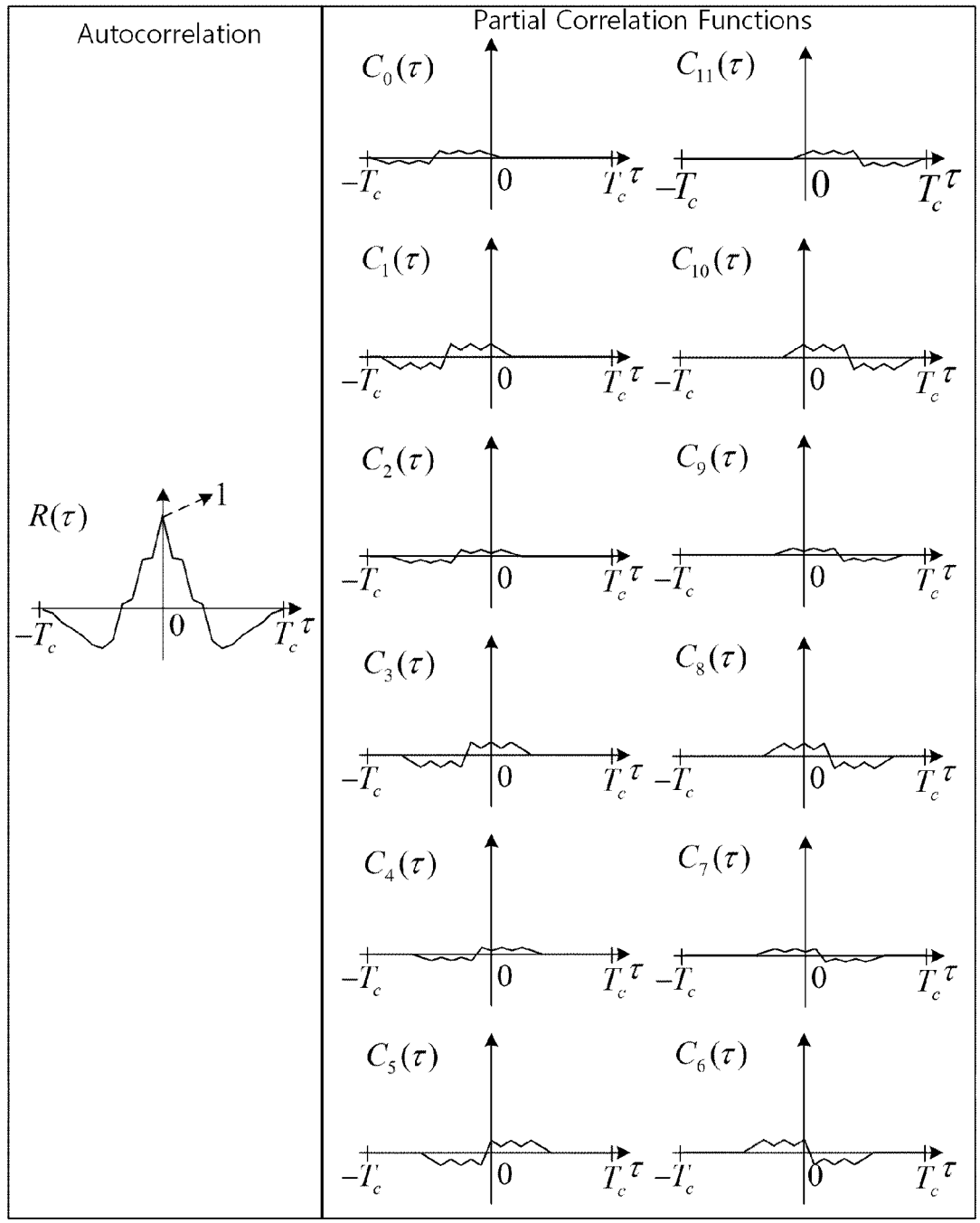
FIG. 4 illustrates the waveform of the autocorrelation function of a received CBOC(6,1,1/11,'−') signal for the apparatus for tracking a CBOC signal according to the embodiment of the present invention and the waveforms of partial correlation functions constituting the autocorrelation function.

FIG. 4 illustrates the waveform of the autocorrelation function of a received CBOC(6,1,1/11,'−') received signal for the apparatus for tracking a CBOC signal according to the embodiment of the present invention and the waveforms of partial correlation functions constituting the autocorrelation function.

Referring to FIG. 4, the autocorrelation function of the CBOC(6,1,1/11,'−') signal may be represented by the sum of 12 partial correlation functions based on the autocorrelation of 12 partial received signals.

From the waveforms of the 12 partial correlation functions $C_m(\tau)$, in can be observed that the last peak is formed on a vertical axis particularly in first and twelfth partial correlation functions $C_0(\tau)$ and $C_{11}(\tau)$ and thus the product of the first and twelfth partial correlation functions $C_0(\tau)$ and $C_{11}(\tau)$ has a positive value in a narrow interval near an origin and has 0 in the remaining interval.

In this case, when algebraic relations, such as the following Equation 5, named the first elimination operation in the present specification are used, the product of two waveforms is 0 in the remaining interval other than an interval near an origin, so that the remaining interval is made 0 by the first elimination operation, and the narrow interval near the origin may be left:

$$\begin{cases} A \cdot B = 0 \text{ if } AB \leq 0 \\ A \cdot B > 0 \text{ if } AB > 0 \end{cases} \quad (5)$$

where $A \cdot B \; |A| + |B| - |A - B|$

Accordingly, a first correlation function may be generated by performing the first elimination operation of the first and twelfth partial correlation functions $C_0(\tau)$ and $C_{11}(\tau)$, as in the following Equation 6:

$$R_0(\tau) = C_0(\tau)C_{11}(\tau)$$

$$|C_0(\tau)| + |C_{11}(\tau)| - |C_0(\tau) - C_{11}(\tau)| \quad (6)$$

Figure 5:
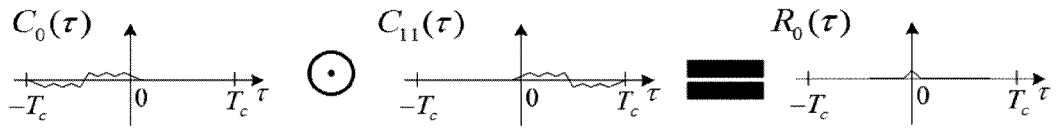
FIG. 5 illustrates a first correlation function that is generated from the first and twelfth partial correlation functions of partial correlation functions constituting the autocorrelation function of the received CBOC(6,1,1/11,'−') signal for the apparatus for tracking a CBOC signal according to the embodiment of the present invention.

Referring to FIG. 5 in order to illustrate the waveform of a first correlation function $R_0(\tau)$, FIG. 5 illustrates a first correlation function that is generated from the first and twelfth partial correlation functions of partial correlation functions constituting the autocorrelation function of the received CBOC(6,1,1/11,'−') signal for the apparatus for tracking a CBOC signal according to the embodiment of the present invention.

Although the first correlation function $R_0(\tau)$ has no side peaks but has only a main peak, the width and height thereof are still broad and low, as can be seen from FIG. 5.

Figure 6:
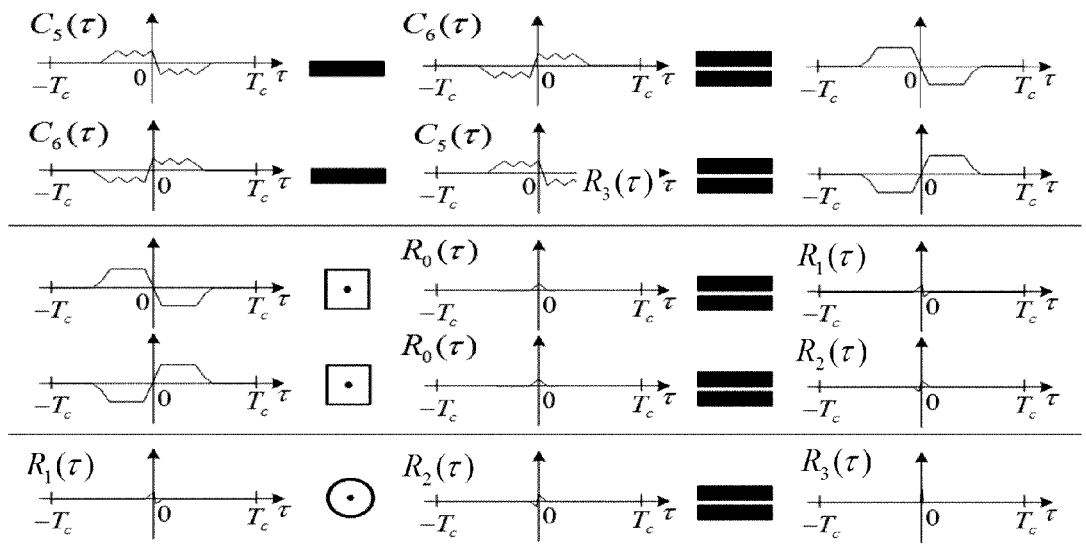
FIG. 6 illustrates second and third correlation functions that are generated from the sixth and seventh partial correlation functions of partial correlation functions constituting the autocorrelation function of the received CBOC(6,1,1/11,'−') signal for the apparatus for tracking a CBOC signal according to the embodiment of the present invention and the first correlation function, and also illustrates a fourth correlation function that is generated from the second and third correlation functions.

FIG. 6 illustrates second and third correlation functions that are generated from the sixth and seventh partial correlation functions of partial correlation functions constituting the autocorrelation function of the received CBOC(6,1,1/11,'−') signal for the apparatus for tracking a CBOC signal according to the embodiment of the present invention and the first correlation function, and also illustrates a fourth correlation function that is generated from the second and third correlation functions.

Referring to FIG. 6, in order to make the first correlation function $R_0(\tau)$ narrower and sharper, additional waveform shaping may be performed, as in the following Equation 7:

$$\begin{cases} R_1(\tau) = (C_5(\tau) - C_6(\tau)) * R_0(\tau) \\ |C_5(\tau) - C_6(\tau) + R_0(\tau)| - |C_5(\tau) - C_6(\tau)| \\ R_2(\tau) = (C_6(\tau) - C_5(\tau)) * R_0(\tau) \end{cases} \quad (7)$$

where $A * B \; |A + B| - |A|$

The operator * of Equation 7 performs the operation |A+B|−|A| that is called a second elimination operation in the present specification.

In accordance with Equation 7, the second and third correlation functions $R_1(\tau)$ and $R_2(\tau)$ are generated by performing second elimination operations between each of the two difference waveforms of the sixth and seventh partial correlation functions $R_5(\tau)$ and $R_6(\tau)$, i.e., each of a waveform obtained by subtracting the seventh partial correlation function $R_6(\tau)$ from the sixth partial correlation function $R_5(\tau)$ and a waveform obtained by subtracting the sixth partial correlation function $R_5(\tau)$ from the seventh partial correlation function $R_6(\tau)$, and the first correlation function $R_0(\tau)$.

Since the second and third correlation functions $R_1(\tau)$ and $R_2(\tau)$ have a zero-crossing point at a point closer to an origin than the first correlation function $R_0(\tau)$, a sharper fourth correlation function may be generated by performing a first elimination operation on the second and third correlation functions $R_1(\tau)$ and $R_2(\tau)$, as in Equation 8:

$$R_3(\tau) = R_1(\tau)R_2(T) \quad (8)$$

Since the fourth correlation function $R_3(\tau)$ has only a very narrow main peak and a low height, as illustrated in FIG. 6, the signal tracking performance thereof is not good.

In this case, since a noise component increases also when only the height of the main peak is increased by simply scaling the fourth correlation function $R_3(\tau)$, there is no advantage in the improvement of performance even when the main peak is made sharp.

Accordingly, the present invention uses results obtained by performing a first elimination operation on the fourth correlation function $R_3(\tau)$ and the remaining partial correlation functions in order to eliminate side peaks from the remaining partial correlation functions and maximally acquire the information a peak at the origin from each partial correlation function.

Figure 7:
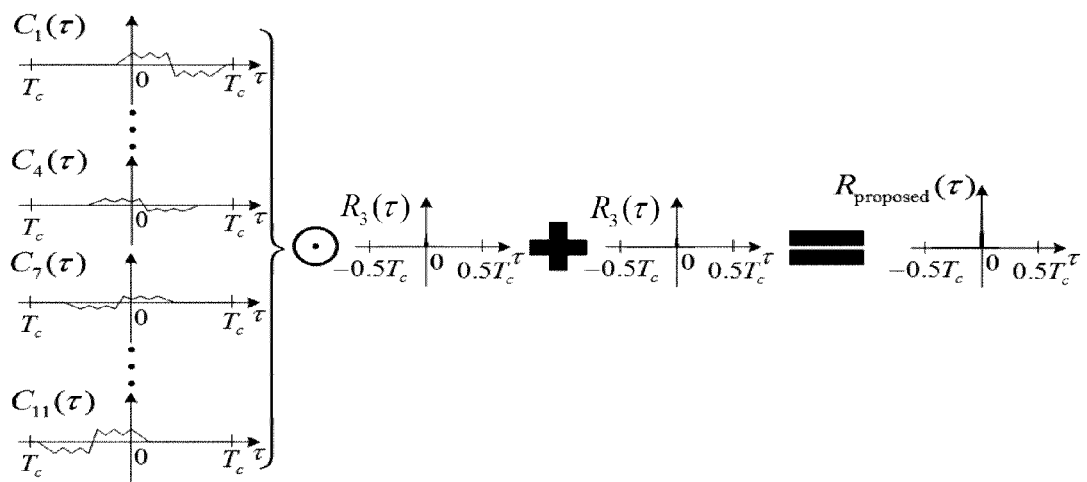
FIG. 7 illustrates a process of generating a main correlation function by summing the results of the elimination operations of partial correlation functions constituting the autocorrelation function of the received CBOC(6,1,1/11,'−') signal for the apparatus for tracking a CBOC signal according to the embodiment of the present invention and a fourth correlation function and the fourth correlation function.

FIG. 7 illustrates a process of generating a main correlation function by summing the results of the elimination operations of partial correlation functions constituting the autocorrelation function of the received CBOC(6,1,1/11,'−') signal for the apparatus for tracking a CBOC signal according to the embodiment of the present invention and a fourth correlation function, and the fourth correlation function.

Referring to FIG. 7, a main correlation function $R_{proposed}(\tau)$ is generated by summing the results of a first elimination operation between the remaining partial correlation functions $\{C_m(\tau)\}_{m=1}^{4}$ and $\{c_m(\tau)\}_{m=7}^{10}$, excluding the first and twelfth partial correlation functions $C_0(\tau)$ and $C_{11}(\tau)$ used for the generation of the first correlation function $R_0(\tau)$ and the sixth and seventh partial correlation functions $C_5(\tau)$ and $C_6(\tau)$ used for the generation of the second and third correlation functions $R_1(\tau)$ and $R_2(\tau)$, and a fourth correlation function $R_3(\tau)$, and the fourth correlation function $R_3(\tau)$, as in Equation 9:

$$R_{proposed}(\tau) = R_3(\tau) + \sum_{\substack{m=1 \\ m \neq 5,6}}^{10} C_m(\tau) R_3(\tau) \tag{9}$$

The width of the base of the main peak of the main correlation function $R_{proposed}(\tau)$ of Equation 9 is merely $0.026T_c$, and the height of the main peak is 1.475 times the peak height of a normalized autocorrelation function. Accordingly, the slope of the main peak is about $11.46T_c^{-1}$, and is considerably higher than the slope $5.39T_c^{-1}$ of the main peak of a CBOC autocorrelation function. Accordingly, signal tracking performance can be considerably improved.

In an embodiment, a main correlation function $R_{proposed}(\tau)$ is generated by summing the results of a first elimination operation between all 12 partial correlation functions $\{C_m(\tau)\}_{m=0}^{11}$ and a fourth correlation function $R_3(\tau)$, and the fourth correlation function $R_3(\tau)$, as in Equation 10:

$$R_{propsed}(\tau) = R_3(\tau) + \sum_{m=0}^{11} C_m(\tau) R_3(\tau) \tag{10}$$

Figure 8:
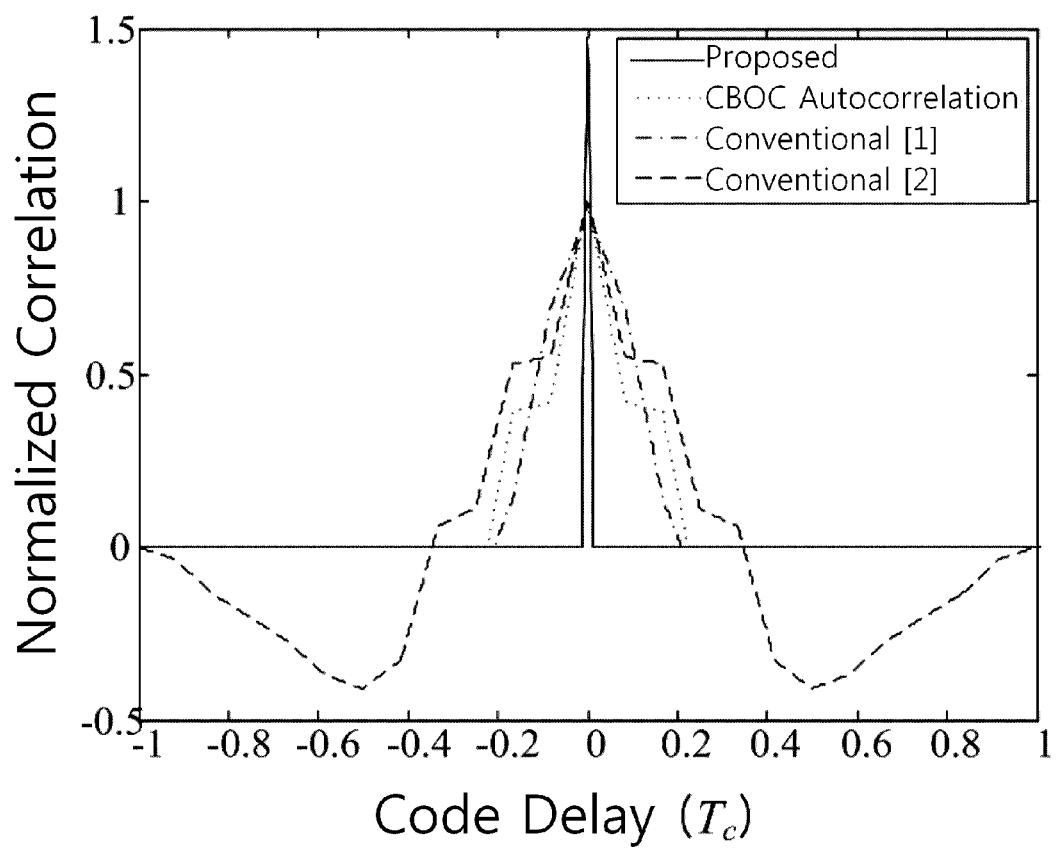
FIG. 8 is a graph comparing the main correlation function and the autocorrelation function, generated as in FIG. 7, and the correlation functions of the conventional methods with the CBOC(6,1,1/11,'−') signal for the apparatus for tracking a CBOC signal according to the embodiment of the present invention.

Meanwhile, FIG. 8 is a graph comparing the main correlation function and the autocorrelation function, generated as in FIG. 7, and the correlation functions of the conventional methods with the CBOC(6,1,1/11,'−') signal for the apparatus for tracking a CBOC signal according to the embodiment of the present invention.

Referring to FIG. 8, the main peaks of the main correlation function $R_{proposed}(\tau)$ the CBOC autocorrelation function, and the conventional invention [1] and the conventional invention [2] introduced in the Non-Patent Document Section are compared with each other in a superposed manner.

The slope of the main peak of the main correlation function $R_{proposed}(\tau)$ is approximately 2.1 times the slope of the main peak of the normalized CBOC autocorrelation function.

Accordingly, the main correlation function $R_{proposed}(\tau)$ of the present invention can provide higher positioning accuracy.

Referring back to FIG. 3, the DLL 24 using such a main correlation function is described in greater detail.

In general, the DLL 24 determines whether two correlation values based on an early delay value preceding a desired delay value and a late delay value following the desired delay value have passed the apex of a main peak while driving a loop while gradually changing the delay values based on the two correlation values to which the early delay value and the late delay value have been applied.

In greater detail, for example, when a code delay value is gradually changed from −1 chip to +1 chip, an early correlation value based on an early delayed signal having an early delay value larger than a current delay value reaches the left slope of a main peak and passes the apex of the main peak earlier than a late correlation value based a late delayed signal having a late delay value smaller than the current delay value.

If the difference between the early correlation value and the late correlation value is tracked, the difference will continue to have a positive value, will gradually decrease from the point where the early correlation value passes the apex of the main peak when the early correlation value is located on the left slope of the main peak, will become 0 when the early correlation value and the late correlation value are symmetrical with respect to the apex, and will have a negative value when the early correlation value further proceed to the right slope of the main peak.

Through this observation, it may be said that the prompt correlation value reaches the apex at a point where the difference between the early correlation value and the late correlation value passes 0, that is, a zero-crossing point.

A discrimination function capable of discriminating the state of a prompt correlation value, such as the difference between the early correlation value and the late correlation value, is generally referred to as a discriminator. Although a discrimination function for a discriminator may be devised in various manners, a discrimination function D(t), such as that of the following Equation 11, may be used:

$$D(\tau) = R_{proposed}^2\left(\tau + \frac{\Delta}{2}\right) - R_{proposed}^2\left(\tau - \frac{\Delta}{2}\right) \tag{11}$$

where $\Delta$ is the difference between the early and late delay values.

That is, if a change in a value obtained by subtracting the square of the result of the late main correlation function from the square of the result of the early main correlation function is tracked using such a discrimination function and then zero crossing is detected, it may be determined that the main correlation function has reached the apex of the main peak at the delay value.

Next, the operation of the DLL 24 is described based on the discussion so far set forth.

First, the local signal generation unit 31 generates an early and late delayed signal pair $r(t+\tau+\Delta/2)$ and $r(t+\tau-\Delta/2)$ early and late delayed, respectively, based on a phase delay $\tau$ and a delay value difference $\Delta$ provided by the NCO 39, with respect to the signal pulse train of a CBOC(6,1,1/11)-modulated received signal r(t), and then provides them to the early and late mixers 32a and 32b, respectively.

The early and late mixers 32a and 32b output early and late mixing signal pairs, obtained by multiplying the received signal r(t) by the early and late delayed received signal pair $r(t+\tau+\Delta/2)$ and $r(t+\tau-\Delta/2)$, to the early and late correlation units 33a and 33b, respectively.

The early and late autocorrelation units 33a and 33b generate first to twelfth early partial correlation functions $\{C_m(\tau+\Delta/2)\}_{m=0}^{11}$ and first to twelfth late partial correlation functions $\{C_m(\tau-\Delta/2)\}_{m=0}^{11}$ by performing the autocorrelation operation of early and late mixing signal pairs with respect to the total time T ($0 \leq t \leq T$), as in Equation 4.

Next, the early first correlation function generation unit 34a generates an early first correlation function $R_0(\tau+\Delta/2)$ by performing a first elimination operation on first and twelfth early partial correlation functions $C_0(\tau+\Delta/2)$ and $C_{11}(\tau+\Delta/2)$, as in Equation 6.

The early fourth correlation function generation unit 35a generates early second and third correlation functions $R_1(\tau+\Delta/2)$ and $R_2(\tau+\Delta/2)$ by performing second elimination operations between each of the two difference waveforms of the early sixth and seventh partial correlation functions $C_5(\tau+\Delta/2)$ and $C_6(\tau+\Delta/2)$ of the first to twelfth early partial correlation functions $\{C_m(\tau+\Delta/2)\}_{m=0}^{11}$ and the early first correlation function $R_0(\tau+\Delta/2)$, and acquires an early fourth correlation function $R_3(\tau+\Delta/2)$ by performing a first elimination operation on the early second and third correlation functions $R_1(\tau+\Delta/2)$ and $R_2(\tau+\Delta/2)$.

Similarly, the late first correlation function generation unit 34b generates a late first correlation function $R_0(\tau-\Delta/2)$ by performing a first elimination operation on first and twelfth early partial correlation functions $C_0(\tau-\Delta/2)$ and $C_{11}(\tau-\Delta/2)$, as in Equation 6.

Furthermore, the late fourth correlation function generation unit 35b generates late second and third correlation functions $R_1(\tau-\Delta/2)$ and $R_2(\tau-\Delta/2)$ by performing second elimination operations between each of the two difference waveforms of the late sixth and seventh partial correlation functions $C_5(\tau-\Delta/2)$ and $C_6(\tau-\Delta/2)$ of the first to twelfth late partial correlation functions $\{C_m(\tau-\Delta/2)\}_{m=0}^{11}$ and the late first correlation function $R_0(\tau-\Delta/2)$, and acquires a late fourth correlation function $R_3(\tau-\Delta/2)$ by performing a first elimination operation on the late second and third correlation functions $R_1(\tau-\Delta/2)$ and $R_2(\tau-\Delta/2)$.

The early combination unit 36a acquires the early main correlation function $R_{proposed}(\tau+\Delta/2)$ by summing the results of an elimination operation between the early fourth correlation function $R_3(\tau+\Delta/2)$ and 12 early partial correlation functions $\{C_m(\tau+\Delta/2)\}_{m=0}^{11}$ or 8 early partial correlation functions $\{C_m(\tau+\Delta/2)\}_{m=1}^{4}$ and $\{C_m(\tau+\Delta/2)\}_{m=7}^{10}$ in an embodiment and the early fourth correlation function $R_3(\tau+\Delta/2)$.

Similarly, the late combination unit 36b acquires the late main correlation function $R_{proposed}(\tau-\Delta/2)$ by summing the results of an elimination operation between the late fourth correlation function $R_3(\tau-\Delta/2)$ and 12 late partial correlation functions $\{C_m(\tau-\Delta/2)\}_{m=0}^{11}$ or 8 late partial correlation functions $\{C_m(\tau-\Delta/2)\}_{m=1}^{4}$ and $\{C_m(\tau-\Delta/2)\}_{m=7}^{10}$ in an embodiment and the late fourth correlation function $R_3(\tau-\Delta/2)$.

The discriminator mixer 37 outputs an output value obtained by subtracting the square of the late main correlation function $R_{proposed}(\tau-\Delta/2)$ from the square of the early main correlation accordance with a predetermined function $R_{proposed}(\tau+\Delta/2)$ in accordance with a predetermined discrimination function, for example, Equation 11.

The loop filter 38 may filter out the noise component of the discrimination output of the discriminator mixer 37.

The NCO 39 determines the phase delay $\tau$ of the delayed signal for the received signal based on the filtered discrimination output, and outputs the determined phase delay $\tau$ to the local signal generation unit 31.

For example, the NCO 39 may increase the phase delay $\tau$ by a predetermined interval and then output the increased phase delay $\tau$ to the local signal generation unit 31, on the ground that if the discrimination output is a positive value larger than a predetermined threshold value, this means that an early correlation value is larger than a late correlation value and also means that the applied phase delay $\tau$ is smaller than a phase delay corresponding to the apex of a main peak in light of the shape of the main peak of a main correlation function.

Furthermore, if it is determined based on the filtered discrimination output that the value of the main correlation function based on the phase delay $\tau$ is located at the apex of the main peak, the NCO 39 outputs the value of the phase delay $\tau$ at the time to the local code generation unit 22 as a code delay value.

Figure 9:
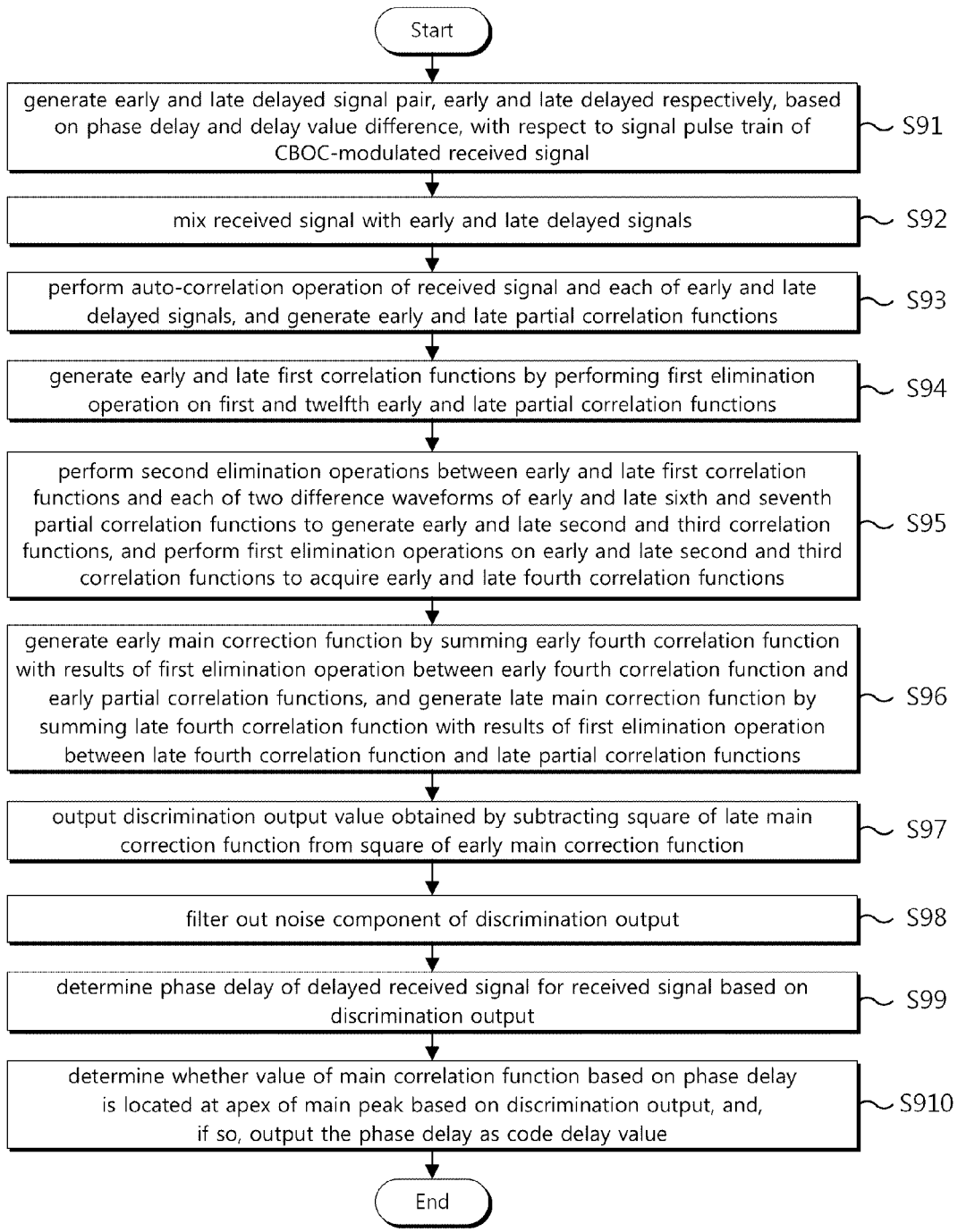
FIG. 9 is a flowchart illustrating a method of tracking a CBOC signal according to another embodiment of the present invention.

FIG. 9 is a flowchart illustrating a method of tracking a CBOC signal according to another embodiment of the present invention.

First, at step S91, an early and late delayed signal pair $r(t+\tau+\Delta/2)$ and $r(t+\tau-\Delta/2)$ early and late delayed, respectively, based on a phase delay $\tau$ and a delay value difference $\Delta$ is generated with respect to the signal pulse train of a CBOC (6,1,1/11)-modulated received signal $r(t)$.

At step S92, an early and late mixing signal pair, obtained by multiplying the received signal $r(t)$ by the early and late delayed received signal pair $r(t+\tau+\Delta/2)$ and $r(t+\tau-\Delta/2)$, is output.

At step S93, first to twelfth early partial correlation functions $\{C_m(\tau+\Delta/2)\}_{m=0}^{11}$ and first to twelfth late partial correlation functions $\{C_m(\tau-\Delta/2)\}_{m=0}^{11}$ are generated by performing the autocorrelation operations of early and late mixing signal pairs with respect to the total time $T(0 \le t \le T)$, as in Equation 4.

Thereafter, at step S94, an early first correlation function $R_0(\tau+\Delta/2)$ is generated by performing a first elimination operation on first and twelfth early partial correlation functions $C_0(\tau+\Delta/2)$ and $C_{11}(\tau+\Delta/2)$, as in Equation 6; and a late first correlation function $R_0(\tau-\Delta/2)$ is generated by performing a first elimination operation on first and twelfth late partial correlation functions $C_0(\tau-\Delta/2)$ and $C_{11}(\tau-\Delta/2)$, as in Equation 6.

At step S95, early second and third correlation functions $R_1(\tau+\Delta/2)$ and $R_2(\tau+\Delta/2)$ are generated by performing second elimination operations between each of the two difference waveforms of the early sixth and seventh partial correlation functions $C_5(\tau+\Delta/2)$ and $C_6(\tau+\Delta/2)$ of the first to twelfth early partial correlation functions $\{C_m(\tau+\Delta/2)\}_{m=0}^{11}$ and the early first correlation function $R_0(\tau+\Delta/2)$, and an early fourth correlation function $R_3(\tau+\Delta/2)$ is acquired by performing a first elimination operation on the early second and third correlation functions $R_1(\tau+\Delta/2)$ and $R_2(\tau+\Delta/2)$; and late second and third correlation functions $R_1(\tau-\Delta/2)$ and $R_2(\tau-\Delta/2)$ are generated by performing second elimination operations between each of the two difference waveforms of the late sixth and seventh partial correlation functions $C_5(\tau-\Delta/2)$ and $C_6(\tau-\Delta/2)$ of the first to twelfth late partial correlation functions $\{C_m(\tau-\Delta/2)\}_{m=0}^{11}$ and the late first correlation function $R_0(\tau-\Delta/2)$, and a late fourth correlation function $R_3(\tau-\Delta/2)$ is acquired by performing a first elimination operation on the late second and third correlation functions $R_1(\tau-\Delta/2)$ and $R_2(\tau-\Delta/2)$.

At step S96, an early main correlation function $R_{proposed}(\tau+\Delta/2)$ is acquired by summing the results of an elimination operation between the early fourth correlation function $R_3(\tau+\Delta/2)$ and 12 early partial correlation functions $\{C_m(\tau+\Delta/2)\}_{m=0}^{11}$, and the early fourth correlation function $R_3(\tau+\Delta/2)$; and a late main correlation function $R_{proposed}(\tau-\Delta/2)$ is acquired by summing the results of an elimination operation between the late fourth correlation function $R_3(\tau-\Delta/2)$ and 12 late partial correlation functions $\{C_m(\tau-\Delta/2)\}_{m=0}^{11}$, and the late fourth correlation function $R_3(\tau-\Delta/2)$.

In an embodiment, at step S96, an early main correlation function $R_{proposed}(\tau+\Delta/2)$ is acquired by summing the results of an elimination operation between the early fourth correlation function $R_3(\tau+\Delta/2)$ and 8 early partial correlation functions $\{C_m(\tau+\Delta/2)\}_{m=1}^{4}$ and $\{C_m(\tau+\Delta/2)\}_{m=7}^{10}$, and the early fourth correlation function $R_3(\tau+\Delta/2)$; and a late main correlation function $R_{proposed}(\tau-\Delta/2)$ is acquired by summing the results of an elimination operation between the late fourth correlation function $R_3(\tau-\Delta/2)$ and 8 late partial correlation functions $\{C_m(\tau-\Delta/2)\}_{m=1}^4$ and $\{C_m(\tau-\Delta/2)\}_{m=7}^{10}$, and the late fourth correlation function $R_3(\tau-\Delta/2)$.

At step S97, an output value obtained by subtracting the square of the late main correlation function $R_{proposed}(\tau-\Delta/2)$ from the square of the early main correlation function $R_{proposed}(\tau+\Delta/2)$ in accordance with a predetermined discrimination function, such as Equation 11, is output.

At step S98, the noise component of the discrimination output may be filtered out.

At step S99, the phase delay $\tau$ of the delayed signal with respect to the received signal may be determined based on the filtered discrimination output.

At step S910, if it is determined that the main correlation function value based on the phase delay $\tau$ is located at the apex of a main peak based on the filtered discrimination output, the value of the phase delay $\tau$ at the time is output as a code delay value.

Figure 10:
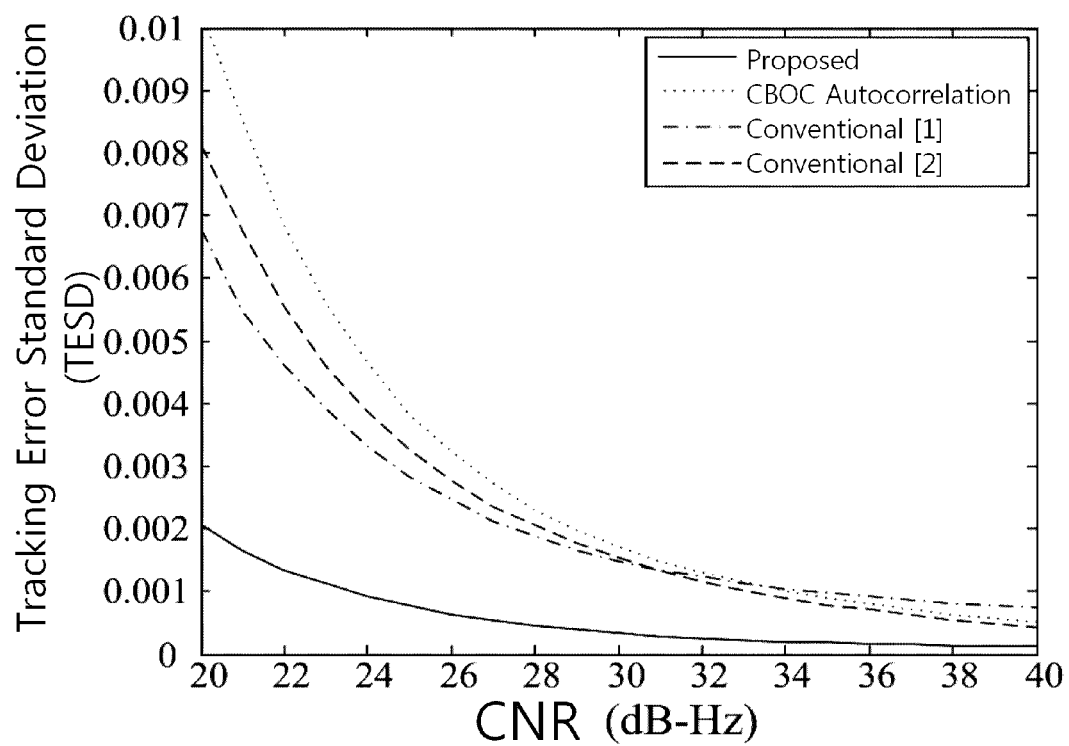
FIG. 10 is a graph illustrating the performance of the apparatus and method for tracking a CBOC signal according to the embodiments of the present invention.

FIG. 10 is a graph illustrating the performance of the apparatus and method for tracking a CBOC signal according to the embodiments of the present invention.

Performance index is tracking error standard deviation (TESD). The TESD of the autocorrelation function of a CBOC(6,1,1/11) signal and TESD using a main correlation function according to the present invention were simulated within a predetermined carrier-to-noise ratio (CNR) range.

It can be seen that, when the TESDs were observed while the CNR was being varied, the case of performing tracking using a main correlation function according to the present invention exhibited lower TESDs than the case of performing tracking using an autocorrelation function and main correlation functions according to the conventional methods at CNRs in all ranges of interest, and, in particular, exhibited remarkably excellent performance indices having a CNR gain equal to or higher than 3 dB-Hz at the same TESD value in the CNR range of interest ranging from 20 to 30 dB-Hz.

Although the difference in TESD between the autocorrelation function and other main correlation functions was reduced under the condition that the CNR had a high value ranging from 40 to 50 dB-Hz, the main correlation function of the present invention exhibited similar or higher performance substantially in the almost overall CNR range.

The above embodiments and the accompanying drawings are intended merely to clearly illustrate part of the technical spirit of the present invention, and it will be apparent to those skilled in the art that modifications and specific embodiments that those skilled in the art can easily derive from the present specification and the accompanying drawings are all included in the range of the rights of the present invention.

Furthermore, the apparatus according to the present invention may be implemented as computer-readable code stored on a computer-readable storage medium. The computer-readable storage medium includes all types of storage devices on which data that can be read by a computer system can be stored. Examples of the storage medium include ROM, RAM, an optical disk, magnetic tape, a floppy disk, hard disk, nonvolatile memory. Furthermore, the computer-readable medium may be distributed across a computer system connected over a network, and thus computer-readable code may be stored and executed in a distributed manner.

What is claimed is:

1. A delay locked loop (DLL), comprising:
a local signal generation unit configured to generate an early and late delayed signal pair $r(t+\tau+\Delta/2)$ and $r(t+\tau-\Delta/2)$, early and late delayed, respectively, based on a phase delay $\tau$ and a delay value difference, with respect to a signal pulse train of a composite binary offset carrier (CBOC)(6,1,1/11)-modulated received signal r(t);

early and late autocorrelation units configured to generate first to twelfth early partial correlation functions $\{C_m(\tau+\Delta/2)\}_{m=0}^{11}$ and first to twelfth late partial correlation functions $\{C_m(\tau-\Delta/2)\}_{m=0}^{11}$ by performing an autocorrelation operation of an early and late mixing signal pair with respect to the total time T($0\leq t \leq T$);

early and late first correlation function generation units configured to generate an early first correlation function $R_0(\tau+\Delta/2)$ by performing a first elimination operation on first and twelfth early partial correlation functions $C_0(\tau+\Delta/2)$ and $C_{11}(\tau+\Delta/2)$ and to generate a late first correlation function $R_0(\tau-\Delta/2)$ by performing a first elimination operation on first and twelfth early partial correlation functions $C_0(\tau-\Delta/2)$ and $C_{11}(\tau-\Delta/2)$;

an early fourth correlation function generation unit configured to generate early second and third correlation functions $R_1(\tau+\Delta/2)$ and $R_2(\tau+\Delta/2)$ by performing second elimination operations between each of the two difference waveforms of the early sixth and seventh partial correlation functions $C_5(\tau+\Delta/2)$ and $C_6(\tau+\Delta/2)$ of the first to twelfth early partial correlation functions $\{C_m(\tau+\Delta/2)\}_{m=0}^{11}$ and an early first correlation function $R_0(\tau+\Delta/2)$, and to acquire an early fourth correlation function $R_3(\tau+\Delta/2)$ by performing a first elimination operation on the early second and third correlation functions $R_1(\tau+\Delta/2)$ and $R_2(\tau+\Delta/2)$;

a late fourth correlation function generation unit configured to generate late second and third correlation functions $R_1(\tau-\Delta/2)$ and $R_2(\tau-\Delta/2)$ by performing second elimination operations between each of the two difference waveforms of the late sixth and seventh partial correlation functions $C_5(\tau-\Delta/2)$ and $C_6(\tau-\Delta/2)$ of the first to twelfth late partial correlation functions $\{C_m(\tau-\Delta/2)\}_{m=0}^{11}$ and a late first correlation function $R_0(\tau-\Delta/2)$, and to acquire a late fourth correlation function $R_3(\tau-\Delta/2)$ by performing a first elimination operation on the late second and third correlation functions $R_1(\tau-\Delta/2)$ and $R_2(\tau-\Delta/2)$;

early and late combination units configured to acquire the early main correlation function $R_{proposed}(\tau+\Delta/2)$ by summing results of an elimination operation between the early fourth correlation function $R_3(\tau+\Delta/2)$ and 8 early partial correlation functions $\{C_m(\tau+\Delta/2)\}_{m=1}^4$ and $\{C_m(\tau+\Delta/2)\}_{m=7}^{10}$ and the early fourth correlation function $R_3(\tau+\Delta/2)$, and to acquire the late main correlation function $R_{proposed}(\tau-\Delta/2)$ by summing results of an elimination operation between the late fourth correlation function $R_3(\tau-\Delta/2)$ and 8 late partial correlation functions $\{C_m(\tau-\Delta/2)\}_{m=1}^4$ and $\{C_m(\tau-\Delta/2)\}_{m=7}^{10}$ and the late fourth correlation function $R_3(\tau-\Delta/2)$; and a numerical control oscillator (NCO) configured to determine a phase delay $\tau$ of a delayed signal for the received signal based on values of the early and late main correlation functions, and to output the determined phase delay $\tau$ to the local signal generation unit;

wherein the first elimination operation is an operation that satisfies algebraic relations in which $|A|+|B|-|A-B|=0$ if real numbers A and B satisfy $AB\leq 0$ and $|A|+|B|-|A-B|>0$ if real numbers A and B satisfy $AB>0$; and wherein the second elimination operation is an operation that performs $|A+B|-|A|$ with respect to real numbers A and B.

2. The DLL of claim 1, wherein the early partial correlation functions $\{C_m (\tau+\Delta/2)\}_{m=0}^{11}$ and the late partial correlation functions $\{C_m (\tau-\Delta/2)\}_{m=0}^{11}$ are based on the following equation:

$$R(\tau) = \frac{1}{PT} \int_0^T r(t)r(t+\tau)dt$$
$$= \sum_{m=0}^{11} \left\{ \sum_{n=0}^{T/T_c-1} \frac{1}{PT} \int_{(12m+n)T_c}^{(12m+n+1)T_c} r(t)r(t+\tau)dt \right\}$$
$$= \sum_{m=0}^{11} C_m(\tau)$$

where $R(\tau)$ is an autocorrelation function, P is power of the received signal r(t), T is a period of pseudo noise code, and $T_c$ is a period of a chip.

3. The DLL of claim 1, wherein the early first correlation function $R_0(\tau+\Delta/2)$ and the late first correlation function $R_0(\tau-\Delta/2)$ are generated based on the following Equation:

$$R_0(\tau)=C_0(\tau)C_{11}(\tau)$$

$$|C_0(\tau)|+|C_{11}(\tau)|-|C_0(\tau)-C_{11}(\tau)|.$$

4. The DLL of claim 1, wherein:
the early main correlation function combination unit operates to acquire the early main correlation function $R_{proposed}(\tau+\Delta/2)$ by summing results of an elimination operation between the early fourth correlation function $R_3(\tau+\Delta/2)$ and 12 early partial correlation functions $\{C_m (\tau+\Delta/2)\}_{m=0}^{11}$ and the early fourth correlation function $R_3(\tau+\Delta/2)$; and
the late main correlation function combination unit operates to acquire the late main correlation function $R_{proposed}(\tau-\Delta/2)$ by summing results of an elimination operation between the late fourth correlation function $R_3(\tau-\Delta/2)$ and 12 late partial correlation functions $\{C_m (\tau-\Delta/2)\}_{m=0}^{11}$ and the late fourth correlation function $R_3(\tau-\Delta/2)$.

5. The DLL of claim 1, wherein the discrimination function is defined by the following equation:

$$D(\tau) = R_{proposed}^2\left(\tau + \frac{\Delta}{2}\right) - R_{proposed}^2\left(\tau - \frac{\Delta}{2}\right).$$

6. A method of tracking a composite binary offset carrier (CBOC) (6,1,1/11) signal, comprising:
generating an early and late delayed signal pair $r(t+\tau+\Delta/2)$ and $r(t+\tau-\Delta/2)$, early and late delayed, respectively, based on a phase delay $\tau$ and a delay value difference, with respect to a signal pulse train of a CBOC(6,1,1/11)-modulated received signal r(t);
generating first to twelfth early partial correlation functions $\{C_m (\tau+\Delta/2)\}_{m=0}^{11}$ and first to twelfth late partial correlation functions $\{C_m (\tau-\Delta/2)\}_{m=0}^{11}$ by performing an autocorrelation operation of the early and late delayed signal pair with respect to the total time T ($0 \le t \le T$);
generating an early first correlation function $R_0(\tau+\Delta/2)$ by performing a first elimination operation on first and twelfth early partial correlation functions $C_0(\tau+\Delta/2)$ and $C_{11}(\tau+\Delta/2)$, and generating a late first correlation function $R_0(\tau-\Delta/2)$ by performing a first elimination operation on first and twelfth early partial correlation functions $C_0(\tau-\Delta/2)$ and $C_{11}(\tau-\Delta/2)$;
generating early second and third correlation functions $R_1(\tau+\Delta/2)$ and $R_2(\tau+\Delta/2)$ by performing second elimination operations between each of the two difference waveforms of the early sixth and seventh partial correlation functions $C_5(\tau+\Delta/2)$ and $C_6(\tau+\Delta/2)$ of the first to twelfth early partial correlation functions $\{C_m (\tau+\Delta/2)\}_{m=0}^{11}$ and an early first correlation function $R_0(\tau+\Delta/2)$, and acquiring an early fourth correlation function $R_3(\tau+\Delta/2)$ by performing a first elimination operation on the early second and third correlation functions $R_1(\tau+\Delta/2)$ and $R_2(\tau+\Delta/2)$; and generating late second and third correlation functions $R_1(\tau-\Delta/2)$ and $R_2(\tau-\Delta/2)$ by performing second elimination operations between each of the two difference waveforms of the late sixth and seventh partial correlation functions $C_5(\tau-\Delta/2)$ and $C_6(\tau-\Delta/2)$ of the first to twelfth late partial correlation functions $\{C_m (\tau-\Delta/2)\}_{m=0}^{11}$ and a late first correlation function $R_0(\tau-\Delta/2)$, and acquiring a late fourth correlation function $R_3(\tau-\Delta/2)$ by performing a first elimination operation on the late second and third correlation functions $R_1(\tau-\Delta/2)$ and $R_2(\tau-\Delta/2)$;
acquiring an early main correlation function $R_{proposed}(\tau+\Delta/2)$ by summing results of an elimination operation between the early fourth correlation function $R_3(\tau+\Delta/2)$ and 12 early partial correlation functions $\{C_m (\tau+\Delta/2)\}_{m=0}^{11}$ and the early fourth correlation function $R_3(\tau+\Delta/2)$, and acquiring a late main correlation function $R_{proposed}(\tau-\Delta/2)$ by summing results of an elimination operation between a late fourth correlation function $R_3(\tau-\Delta/2)$ and 12 late partial correlation functions $\{C_m (\tau-\Delta/2)\}_{m=0}^{11}$ and the late fourth correlation function $R_3(\tau-\Delta/2)$; and
determining a phase delay $\tau$ of a delayed signal for the received signal based on values of the early and late main correlation functions, and outputting the determined phase delay $\tau$;
wherein the first elimination operation is an operation that satisfies algebraic relations in which $|A|+|B|-|A-B|=0$ if real numbers A and B satisfy $AB \le 0$ and $|A|+|B|-|A-B|>0$ if real numbers A and B satisfy $AB>0$; and
wherein the second elimination operation is an operation that performs $|A+B|-|A|$ with respect to real numbers A and B.

7. The method of claim 6, wherein:
the early main correlation function $R_{proposed}(\tau+\Delta/2)$ is acquired by summing results of an elimination operation between the early fourth correlation function $R_3(\tau+\Delta/2)$ and 12 early partial correlation functions $\{C_m (\tau+\Delta/2)\}_{m=0}^{11}$ and the early fourth correlation function $R_3(\tau+\Delta/2)$; and
the late main correlation function $R_{proposed}(\tau-\Delta/2)$ is acquired by summing results of an elimination operation between a late fourth correlation function $R_3(\tau-\Delta/2)$ and 12 late partial correlation functions $\{C_m (\tau-\Delta/2)\}_{m=0}^{11}$ and the late fourth correlation function $R_3(\tau-\Delta/2)$.

8. A method of generating a correlation function of a composite binary offset carrier (CBOC) (6,1,1/11) signal, comprising:
generating a signal $r(t+\tau)$ delayed based on a phase delay $\tau$ with respect to a signal pulse train of a CBOC(6,1,1/11)-modulated received signal r(t);
generating first to twelfth partial correlation functions $\{C_m (\tau)\}_{m=0}^{11}$ by performing an autocorrelation operation of the received signal r(t) and the delayed signal $r(t+\tau)$ with respect to the total time T ($0 \le t \le T$);

generating an early first correlation function $R_0(\tau)$ by performing a first elimination operation on first and twelfth partial correlation functions $C_0(\tau)$ and $C_{11}(\tau)$;

generating second and third correlation functions $R_1(\tau)$ and $R_2(\tau)$ by performing a second elimination operation between each of the two difference waveforms of sixth and seventh partial correlation functions $C_5(\tau)$ and $C_6(\tau)$ of first to twelfth partial correlation functions $\{C_m(\tau)\}_{m=0}^{11}$ and a first correlation function $R_0(\tau)$, and acquiring a fourth correlation function $R_3(\tau)$ by performing a first elimination operation on the second and third correlation functions $R_1(\tau)$ and $R_2(\tau)$; and acquiring a main correlation function $R_{proposed}(\tau)$ by summing results of an elimination operation between the fourth correlation function $R_3(\tau)$ and each of 8 partial correlation functions $\{C_m(\tau)\}_{m=1}^{4}$ and $\{C_m(\tau)\}_{m=7}^{10}$, and the fourth correlation or function $R_3(\tau)$;

wherein the first elimination operation is an operation that satisfies algebraic relations in which $|A|+|B|-|A-B|=0$ if real numbers A and B satisfy $AB \leq 0$ and $|A|+|B|-|A-B|>0$ if real numbers A and B satisfy $AB>0$; and wherein the second elimination operation is an operation that performs $|A+B|-|A|$ with respect to real numbers A and B.

9. The method of claim 8, wherein the main correlation function $R_{proposed}(\tau)$ is acquired by summing results of an elimination operation between the fourth correlation function $R_3(\tau)$ and 12 partial correlation functions $\{C_m(\tau)\}_{m=0}^{11}$ and the fourth correlation function $R_3(\tau)$.

10. An apparatus for tracking a composite binary offset carrier (CBOC) signal, comprising:
a frequency offset compensation unit configured to output a compensated received signal compensated for frequency offset of a carrier frequency based on a carrier frequency compensation value with respect to a CBOC (6,1,1/11)-modulated received signal;
a local code generation unit configured to generate a delay-compensated local code based on a code delay value;
a mixer configured to mix the delay-compensated local code with the frequency offset-compensated received signal;
a DLL configured to repeatedly track and calculate a code delay value that allows a correlation value obtained by correlating the delay-compensated local signal and the frequency offset-compensated received signal with each other is located at an apex of a main peak of a correlation function, and to provide the calculated code delay value to the local code generation unit;
a phase lock loop (PLL) configured to repeatedly calculate a carrier frequency compensation value based on an autocorrelation value of a local code, based on the tracked code delay value, so that a phase error of a carrier signal can be minimized, and to provide the carrier frequency compensation value to the frequency offset compensation unit; and
a data extraction unit configured to extract spreading data from a mixture of the delay-compensated local code and the compensated received signal;
wherein the DLL operates to:
generate a first correlation function by performing a first elimination operation on a first and twelfth partial correlation function pair of 12 partial correlation functions constituting an autocorrelation function of the CBOC(6, 1,1/11)-modulated received signal; generate a fourth correlation function by performing a first elimination operation between second and third correlation functions that are generated by performing a second elimination operation between two difference functions between sixth and seventh partial correlation functions and the first correlation function; and then sum resulting waveforms that are generated by performing a first elimination operation between each of the 12 partial correlation functions and the fourth correlation function or by performing a first elimination operation between each of remaining 8 partial correlation functions, excluding first, sixth, seventh and twelfth partial correlation functions from the 12 partial correlation functions, and the fourth correlation function, thereby generating a main correlation function;

wherein the first elimination operation is an operation that satisfies algebraic relations in which $|A|+|B|-|A-B|=0$ if real numbers A and B satisfy $AB \leq 0$ and $|A|+|B|-|A-B|>0$ if real numbers A and B satisfy $AB>0$; and wherein the second elimination operation is an operation that performs $|A+B|-|A|$ with respect to real numbers A and B.

11. A satellite navigation signal receiver system, comprising:
a front end unit configured to output a received signal obtained by composite binary offset carrier (CBOC) (6,1,1/11)-modulating a signal in space (SIS) received from an antenna;
a baseband processing unit configured to acquire and track a code delay value with respect to the output received signal using a DLL, to compensate for carrier frequency offset using a PLL, and to extract satellite navigation data from a code delay-compensated local code and a frequency offset-compensated received signal; and
a navigation function processing unit configured to estimate a pseudorange based on the extracted satellite navigation data;
wherein the baseband processing unit operates to:
generate a first correlation function by performing a first elimination operation on a first and twelfth partial correlation function pair of 12 partial correlation functions constituting an autocorrelation function of the CBOC(6, 1,1/11)-modulated received signal;
generate a fourth correlation function by performing a first elimination operation between second and third correlation functions that are generated by performing a second elimination operation between two difference functions between sixth and seventh partial correlation functions and the first correlation function;
generate a main correlation function by summing resulting waveforms that are generated by performing a first elimination operation between each of the 12 partial correlation functions and the fourth correlation function or by performing a first elimination operation between each of the remaining 8 partial correlation functions, excluding first, sixth, seventh and twelfth partial correlation functions from the 12 partial correlation functions, and the fourth correlation function; and
determine a phase delay of a delayed signal for the received signal based on the main correlation function;
wherein the first elimination operation is an operation that satisfies algebraic relations in which $|A|+|B|-|A-B|=0$ if real numbers A and B satisfy $AB \leq 0$ and $|A|+|B|-|A-B|>0$ if real numbers A and B satisfy $AB>0$; and
wherein the second elimination operation is an operation that performs $|A+B|-|A|$ with respect to real numbers A and B.

* * * * *